United States Patent
Saha et al.

(10) Patent No.: US 10,312,827 B2
(45) Date of Patent: Jun. 4, 2019

(54) POWER CONVERSION DEVICE

(71) Applicant: AISIN AW CO., LTD., Anjo-shi, Aichi-ken (JP)

(72) Inventors: Subrata Saha, Anjo (JP); Arinori Shimada, Nishio (JP); Yutaka Hotta, Chiryu (JP)

(73) Assignee: AISIN AW CO., LTD., Anjo (JP)

(*) Notice: Subject to any disclaimer, the term of this patent is extended or adjusted under 35 U.S.C. 154(b) by 0 days.

(21) Appl. No.: 15/763,273

(22) PCT Filed: Nov. 15, 2016

(86) PCT No.: PCT/JP2016/083816
§ 371 (c)(1),
(2) Date: Mar. 26, 2018

(87) PCT Pub. No.: WO2017/086310
PCT Pub. Date: May 26, 2017

(65) Prior Publication Data
US 2018/0278178 A1    Sep. 27, 2018

(30) Foreign Application Priority Data

Nov. 16, 2015  (JP) .................................. 2015-224239
Mar. 30, 2016  (JP) .................................. 2016-068556

(51) Int. Cl.
*H02M 1/00*    (2006.01)
*H02M 1/08*    (2006.01)
(Continued)

(52) U.S. Cl.
CPC .......... *H02M 7/53871* (2013.01); *H02M 1/08* (2013.01); *H02M 7/5387* (2013.01);
(Continued)

(58) Field of Classification Search
CPC ...... H02P 1/00; H02P 1/04; H02P 6/00; H02P 6/14; H02P 21/00; H02P 27/04;
(Continued)

(56) References Cited

U.S. PATENT DOCUMENTS

2015/0180356 A1    6/2015   Norisada et al.

FOREIGN PATENT DOCUMENTS

JP    2008-104282 A    5/2008
JP    2013-223357 A    10/2013
(Continued)

OTHER PUBLICATIONS

Dec. 13, 2016 International Search Report issued in Patent Application No. PCT/JP2016/083816.

*Primary Examiner* — Antony M Paul
(74) *Attorney, Agent, or Firm* — Oliff PLC

(57) ABSTRACT

A power conversion device that includes an inverter circuit in which arms are connected in parallel to each other between a DC positive terminal and a DC negative terminal in accordance with a number of phases of alternating currents of a plurality of phases, the arms for the respective phases each including two switch sections that are connected in series and to be brought into conduction in an on state and out of conduction in an off state, the power conversion device being configured to convert electric power between DC power and AC power of the plurality of phases while a connection point between the two switch sections of each of the arms is set as an AC input or output point of each phase.

20 Claims, 10 Drawing Sheets

(51) Int. Cl.
*H02P 21/22* (2016.01)
*H02P 27/08* (2006.01)
*H02M 7/5387* (2007.01)

(52) U.S. Cl.
CPC ............ *H02P 21/22* (2016.02); *H02P 27/085* (2013.01); *H02M 2001/0054* (2013.01)

(58) Field of Classification Search
CPC .. H02P 27/06; H02P 7/00; H02P 23/00; H02P 27/00; H02P 27/08; H02P 27/085; H02P 1/46; H02P 3/18
USPC ............ 318/400.01, 400.02, 400.14, 400.15, 318/400.26, 400.27, 700, 701, 727, 799, 318/504, 800, 801; 363/40, 44, 95, 120, 363/174, 175
See application file for complete search history.

(56) References Cited

FOREIGN PATENT DOCUMENTS

| | | | | | |
|---|---|---|---|---|---|
| JP | 2013223357 A | * | 10/2013 | .............. | H02M 7/48 |
| JP | 2015-144554 A | | 8/2015 | | |

\* cited by examiner

POWER CONVERSION DEVICE

BACKGROUND

The present disclosure relates to a power conversion device that converts electric power between DC power and AC power of a plurality of phases.

Metal oxide semiconductor field effect transistors (MOSFETs), insulated gate bipolar transistors (IGBTs), and the like are known as switching elements to be used for power circuits such as an inverter circuit. The MOSFET and the IGBT have different electric characteristics because of differences in terms of physical properties and structures. In general, the power circuit such as an inverter circuit is structured by switching elements of the same type. Attempts have been made to achieve an electrically wide application range by structuring a circuit in which a plurality of types of switching element are mixed by taking advantage of the differences in terms of the electric characteristics of the switching elements. Japanese Patent Application Publication No. 2008-104282 from a source described below discloses an inverter circuit including arms in which an upper-stage switching element is the IGBT and a lower-stage switching element is the MOSFET.

This inverter circuit is driven, at the time of high load, through three-phase modulation control in which all three phases are subjected to switching control, and is driven, at the time of low load, through two-phase modulation control in which one phase out of the three phases is fixed and the two remaining phases are subjected to switching control. At the time of low load, a switching loss of the MOSFET is relatively smaller. Therefore, the two-phase modulation control is performed so that the duty factor of the lower-stage MOSFET is higher than the duty factor of the upper-stage IGBT. At the time of high load in which the current increase, a loss of the IGBT is relatively smaller. Therefore, the three-phase modulation control is performed so that the duty factor of the upper-stage IGBT is higher than the duty factor of the lower-stage MOSFET. In Japanese Patent Application Publication No. 2008-104282, through the control described above, the efficiency of the inverter circuit is improved over the entire operating range from the low load to the high load. In Japanese Patent Application Publication No. 2008-104282, there is used an inverter circuit including the IGBT at the upper stage and the MOSFET at the lower stage in order to selectively use the switching elements to be mainly used in an operating range in which the current is relatively small and an operating range in which the current is relatively large. Even though the MOSFET and the IGBT have different switching characteristics (for example, switching responses), there is no such description that the efficiency is improved and noise is reduced in the inverter circuit in consideration of, for example, a control mode in which the lower-stage MOSFET is operated at a switching frequency higher than that of the upper-stage IGBT.

When the upper stage and the lower stage of the arm of the inverter circuit are subjected to switching control complementarily, and when the switching element is controlled in an on state in accordance with the polarity of the generated alternating current, the current may flow in a forward direction with respect to a freewheeling diode. In this case, the current flows through both of the switching element and the freewheeling diode. Therefore, it is preferable to consider a loss of the freewheeling diode. In Japanese Patent Application Publication No. 2008-104282, respective freewheeling diodes having the same characteristics are connected in parallel to both of the IGBT and the MOSFET, and the losses of the freewheeling diodes are not taken into consideration. Those losses occur every time the switching is performed. Therefore, the losses are likely to increase particularly when. the switching frequency of the inverter circuit is increased.

SUMMARY

In view of the background described above, there is a demand to provide a technology in which the loss of the power conversion device including the freewheeling diodes can be reduced even when the upper stage and the lower stage are switched at different switching frequencies in order to improve the efficiency and reduce the noise in the power conversion device including the arms each structured by different types of switching element at the upper stage and the lower stage.

As one aspect, in a power conversion device provided in view of the above, an inverter circuit includes arms that are connected in parallel to each other between a DC positive terminal and a DC negative terminal in accordance with the number of phases of alternating currents of a plurality of phases. The arms for the respective phases each include two switch sections that are connected in series and to be brought into conduction in an on state and out of conduction in an off state. The power conversion device is configured to convert electric power between DC power and AC power of the plurality of phases while a connection point between the two switch sections of each of the arms is set as an AC input or output point of each phase.

Each of the switch sections includes a switching element and a freewheeling diode connected in parallel to the switching element while a direction from the negative terminal to the positive terminal is set as a forward direction. The switching element is a first switching element or a second switching element that is higher in a switching response between the off state and the on state than the first switching element. The freewheeling diode is a first rectifying element or a second rectifying element that is shorter in a reverse recovery time than the first rectifying element. In each of the arms, one of the switch sections including an upper-stage switch section connected to a positive terminal side and a lower-stage switch section connected to a negative terminal side is structured through parallel connection between the first switching element and the second rectifying element, and the other of the switch sections is structured through parallel connection between the second switching element and the first rectifying element.

In a phase angle in which the alternating current of any one phase is positive with respect to the amplitude center, when the current flows through the lower stage of the arm corresponding to the current of this phase, the current flows in the forward direction with respect to the lower-stage freewheeling diode. That is, in the phase angle in which the alternating current is positive, when the current flows through the lower stage of the arm, and when the lower-stage switching element is in the off state, the current flows also through the lower-stage freewheeling diode. The same applies to a case where the alternating current is negative. That is, in a phase angle in which the alternating current is negative, when the current flows through the upper stage of the arm, and when the upper-stage switching element is in the off state, the current flows also through the upper-stage freewheeling diode.

Thus, when the loss of a combination of the switching element of the upper-stage switch section and the freewheeling diode of the lower-stage switch section is small, the loss of the power conversion device can be reduced in the phase angle in which the alternating current is positive. When the loss of a combination of the switching element of the lower-stage switch section and the freewheeling diode of the upper-stage switch section is small, the loss of the power conversion device can be reduced in the phase angle in which the alternating current is negative. As the reverse recovery time of the freewheeling diode is shorter, the time in which the loss occurs is also shorter. Therefore, the loss is reduced. During one cycle of an electrical angle of the alternating current, any one phase out of the plurality of phases is "positive". During one cycle of the electrical angle of the alternating current, any one phase out of the plurality of phases is "negative". By employing one of the combination focusing on the case where the alternating current is "positive" and the combination focusing on the case where the alternating current is "negative", the loss of the power conversion device can be reduced over the entire period in one cycle of the electrical angle.

According to this configuration, one of the switch sections including the upper-stage switch section and the lower-stage switch section is structured through parallel connection between the first switching element and the second rectifying element, and the other of the switch sections is structured through parallel connection between the second switching element and the first rectifying element. According to this configuration, it is possible to achieve a combination in which the upper-stage switching element and the lower-stage freewheeling diode correspond to the second switching element and the second rectifying element, respectively, or a combination in which the lower-stage switching element and the upper-stage freewheeling diode correspond to the second switching element and the second rectifying element, respectively. Thus, the loss of the power conversion device can be reduced. That is, according to this configuration, the loss of the power conversion device including the freewheeling diodes can be reduced even when the upper stage and the lower stage are switched at different switching frequencies in order to improve the efficiency and reduce the noise in the power conversion device including the arms each structured by different types of switching element at the upper stage and the lower stage.

Further features and advantages of the power conversion device will become apparent from the following description of embodiments with reference to the drawings.

DETAILED DESCRIPTION OF EMBODIMENTS

1. First Embodiment

Figure 1:
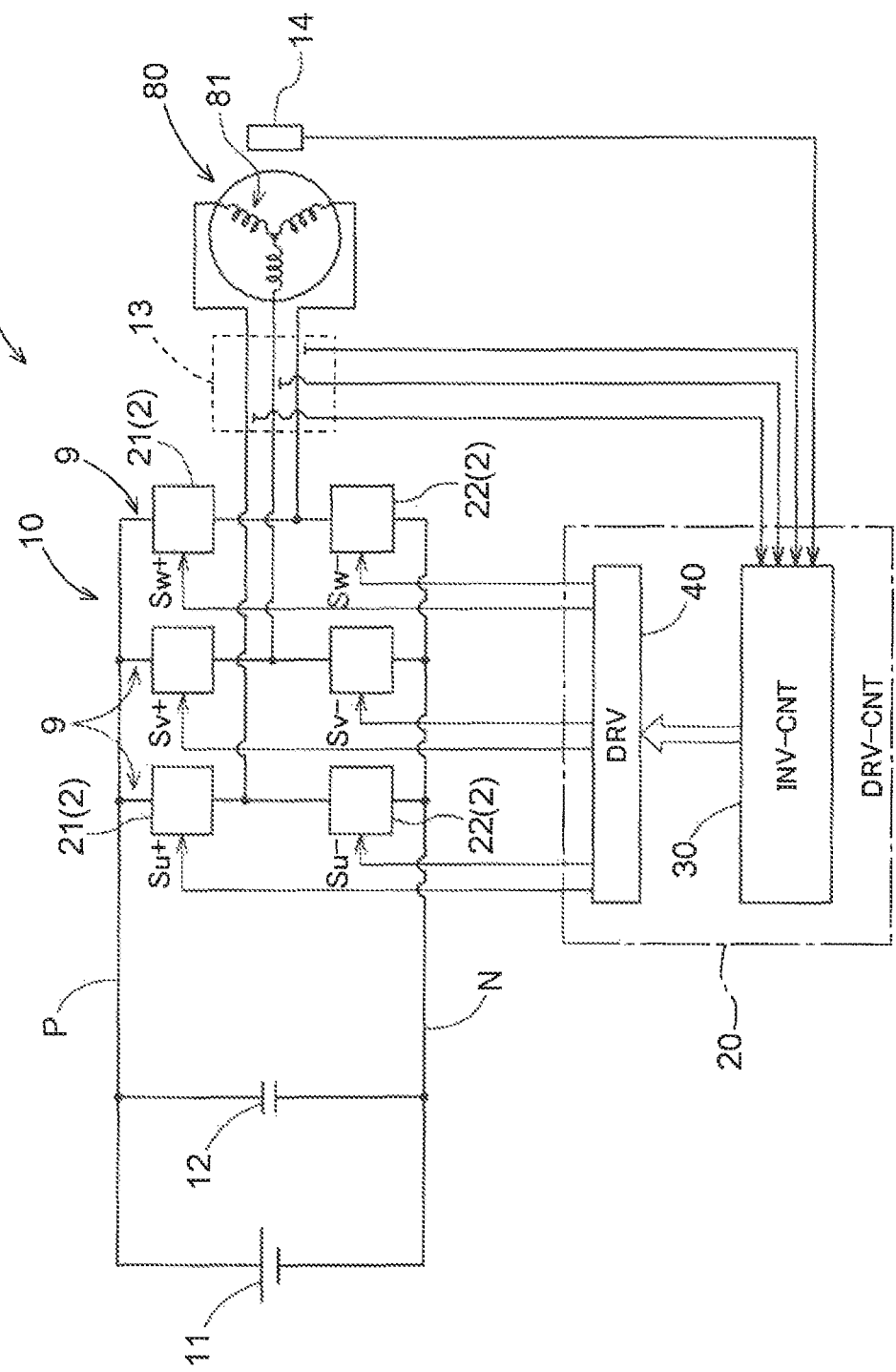
FIG. 1 is a block diagram schematically illustrating the system configuration of a power conversion device.

A first embodiment of a power conversion device 1 is described below with reference to the drawings. A block diagram of FIG. 1 schematically illustrates the system configuration of the power conversion device 1. The power conversion device 1 is provided between a DC power supply 11 and an AC rotating electrical machine 80, and converts electric power between a direct current and an alternating current. In this embodiment, the rotating electrical machine 80 is a rotating electrical machine serving as a source of a driving force for a vehicle such as a hybrid vehicle or an electric vehicle. The rotating electrical machine 80 is a rotating electrical machine to be operated by alternating currents of a plurality of phases (alternating currents of three phases in this case), and may function as both of an electric motor and a generator. The rotating electrical machine 80 converts electric power from the DC power supply 11 into a driving force via an inverter 10 (inverter circuit) (power running). Alternatively, the rotating electrical machine 80 converts a rotational driving force transferred from, for example, an unillustrated internal combustion engine or wheel into electric power to charge the DC power supply 11 via the inverter 10 (regeneration).

In this embodiment, the DC power supply 11 is a high-voltage DC power supply having a rated voltage of, for example, about 50 to 400 [V]. For example, the DC power supply 11 is a secondary battery of nickel hydrogen or lithium ion, a capacitor such as an electric double layer capacitor, or a combination of the secondary battery and the capacitor. The DC power supply 11 is a high-voltage and large-capacity rechargeable DC power supply. When the power conversion device 1 includes a DC converter (DC-DC converter) that boosts an output voltage of the DC power supply 11, this converter may be included in the DC power supply. This converter functions as a buck converter when electric power is regenerated in the DC power supply 11 via the inverter 10.

A voltage on a DC side of the inverter 10 (a voltage across a positive terminal P and a negative terminal N on a DC side of the inverter 10, a voltage across terminals of the DC power supply 11, or an output voltage of the converter) is hereinafter referred to as a DC link voltage (Vdc). A smoothing capacitor 12 (DC link capacitor) that smooths the DC link voltage is provided on the DC side of the inverter 10. The smoothing capacitor 12 stabilizes the DC voltage (DC link voltage) that varies in response to variation of power consumption of the rotating electrical machine 80.

As described above, the inverter 10 converts DC power having the DC link voltage into AC power of a plurality of phases (n phases, provided that n represents a natural number; three phases in this case), and supplies the AC power to the rotating electrical machine 80. Further, the inverter 10 converts AC power of a plurality of phases, which is generated by the rotating electrical machine 80, into DC power, and supplies the DC power to the DC power supply. The inverter 10 includes a plurality of switch sections 2. The switch section 2 includes a switching element 3 and a freewheeling diode 4 as described later with reference to FIG. 3, FIG. 4, and the like. As the switching element 3, there is used a power semiconductor element such as an insulated gate bipolar transistor (IGBT) or a metal oxide semiconductor field effect transistor (MOSFET) using silicon (Si) as a substrate, a silicon carbide-metal oxide semiconductor FET (Sic-MOSFET), a SiC-static induction transistor (SiC-SIT), or a SiC-IGBT using silicon carbide (SiC) as a substrate, or a gallium nitride-MOSFET (GaN-MOSFET) using gallium nitride (GaN) as a substrate.

Hitherto, the Si-IGBT using silicon (Si) as a substrate is widely used as the switching element 3 of the inverter 10. In recent years, semiconductor materials such as silicon carbide (SiC) and gallium nitride (GaN) have also been put into practical use as a substrate of the power MOSFET or IGBT. The semiconductor materials such as SiC and GaN have a wider band gap (wide band gap semiconductors) than Si, and also have a higher breakdown strength than Si. Thus, those semiconductor materials have a higher basic performance than Si. Because of the high breakdown strength, a high-voltage power element (power switching element) using SiC or GaN as a substrate can achieve a drift layer having a smaller film thickness than that of an element using Si as a substrate. Most resistance components of the high-voltage power element are caused by the thickness of the drift layer. With the high-voltage power element using SiC or GaN as a substrate, it is possible to achieve an element having a significantly lower on resistance per unit area than the element using Si as a substrate.

In the high-voltage power element using Si as a substrate, the IGBT (Si-IGBT) having a structure of a bipolar transistor that is a minority carrier device is mainly used in order to suppress an increase in the on resistance along with an increase in the withstand voltage. The IGBT is a switching element having an FET structure at an input stage and a bipolar transistor structure at an output stage on a single semiconductor element. However, the IGBT has a larger switching loss than, for example, the MOSFET, and has a limitation on switching to be performed at a high frequency due to influence of heat generated as a result of the switching loss. In the high-voltage power element using SiC or GaN as a substrate, the drift layer can be structured thinner as described above. Therefore, this high-voltage power element can suppress the increase in the on resistance along with the increase in the withstand voltage even with the structure of the MOSFET that has a high-speed device structure and is a majority carrier device. That is, the high-voltage power element using SiC or GaN as a substrate can achieve a high withstand voltage, a low on resistance, and a high-frequency operation.

For example, the SiC-MOSFET is capable of performing higher-speed switching than the Si-IGBT. Thus, the SiC-MOSFET can be used at a higher switching frequency. Further, reduction in the loss of the inverter 10 can be expected. However, SiC and GaN are more expensive than Si. Therefore, it is likely that the costs of the inverter 10 and the power conversion device 1 including the inverter 10 increase.

As described above, both of the switching element using Si as a material, such as the Si-IGBT, and the switching element using SiC as a material, such as the SiC-MOSFET, have advantages and disadvantages. Therefore, it is preferable to provide an optimum inverter 10 and an optimum power conversion device 1 including the inverter 10 by taking advantage of the strengths of both switching elements.

As illustrated in FIG. 1, the inverter 10 is structured by a bridge circuit including a plurality of sets of arms 9. The inverter 10 includes the arms 9 corresponding to stator coils 81 of respective phases (in the case of three phases, a U phase, a V phase, and a W phase) of the rotating electrical machine 80. The arms 9 each include a pair of upper-stage and lower-stage switch sections 2. Specifically, as illustrated in FIG. 1, the arm 9 for one phase of alternating current is structured by a series circuit including an upper-stage switch section 21 and a lower-stage switch section 22. Each switch section 2 includes the switching element 3 and the freewheeling diode 4 as described later with reference to FIG. 3 and the like.

As illustrated in FIG. 1, each switching element 3 operates based on a switching control signal (Su+, Sv+, Sw+, Su−, Sv−, Sw−) output from a drive control section (DRV-CNT) 20. For example, the switching control signal is a gate driving signal for driving a gate terminal of the IGBT or MOSFET. The drive control section 20 is a control device that controls the power conversion device 1 including the inverter 10 so as to control driving of the AC rotating electrical machine 80 via the power conversion device 1. In this embodiment, the drive control section 20 includes an inverter control device (INV-CNT) 30 and a drive circuit (DRV) 40. The inverter control device 30 is implemented by cooperation between hardware such as a logical processor typified by a microcomputer or a digital signal processor (DSP) and software such as a program or parameters. As a matter of course, the inverter control device 30 may be structured by hardware mainly including an electronic circuit such as a logical circuit. The operating voltage of the inverter control device 30 is about 3.3 to 12 [V]. The inverter control device 30 operates by receiving electric power supplied from an unillustrated low-voltage DC power supply (having a rated voltage of, for example, about 12 to 24 [V]).

The gate driving signal to be input to the control terminal (gate terminal) of the power IGBT or MOSFET that switches a high voltage requires a larger voltage amplitude than that of the operating voltage of the electronic circuit (such as a microcomputer) that structures the inverter control device 30. Therefore, the switching control signal (switching control source signal) generated by the inverter control device 30 is input to the inverter 10 after driving power is imparted by the drive circuit 40 through an increase in the voltage amplitude, amplification of the current, or the like. In this embodiment, the inverter control device 30 and the drive circuit 40 are collectively referred to as the drive control section 20. In this embodiment, the control signal (switching control source signal) to be generated and output by the inverter control device 30 and the control signal to be transferred to the switching element 3 via the drive circuit 40 are not distinguished but collectively referred to as the switching control signal unless otherwise noted.

As illustrated in FIG. 1, the rotating electrical machine 80 includes a rotation sensor 14 that detects a magnetic pole position (rotor rotation angle) and a rotation speed of a rotor of the rotating electrical machine 80 at each time point. For example, the rotation sensor 14 is a resolver. A current sensor 13 measures currents flowing through the stator coils 81 of the respective phases of the rotating electrical machine 80. This embodiment exemplifies a configuration in which the non-contact current sensor 13 measures all the three phases. The inverter control device 30 performs current feedback control based on a required torque and a rotation speed of the rotating electrical machine 80 and a modulation rate. For example, the required torque is provided to the inverter control device 30 from an unillustrated other control device such as a vehicle control device or a vehicle traveling control device. The modulation rate is an index indicating a rate of conversion from a DC voltage (DC link voltage) to an AC voltage, and is a value indicating a ratio of an effective value of a line-to-line voltage among AC voltages of a plurality of phases to a DC voltage. The modulation rate may take a value ranging from "0" to "about 0.78" that is a physical (mathematical) limit value.

Based on the required torque, the rotation speed, the modulation rate, and the like, the inverter control device 30 generates a pulse (modulation pulse) for performing switching control on the inverter 10, and outputs the pulse as the switching control signal. The modulation pulse may be generated as necessary. Alternatively, there may be employed a mode in which a pulse pattern is stored in a memory or the like in advance based on an operating condition of the rotating electrical machine 80 or the inverter 10 and is output through DMA transfer or the like without a load on the processor.

Modulation may refer to a case of conversion from a direct current to an alternating current, and demodulation may refer to a case of conversion from an alternating current to a direct current. In this manner, both cases may be referred to as distinctive terms. Alternatively, both cases may collectively be referred to as modulation/demodulation. This embodiment is described while both types of conversion are referred to as modulation. In this embodiment, the inverter control device 30 controls the rotating electrical machine 80 via the inverter 10 by performing current feedback control using a vector control method. The vector control method is briefly described as follows, and detailed description is omitted.

First, the inverter control device 30 computes current commands in an orthogonal vector coordinate system of the vector control based on the DC link voltage, the required torque, the modulation rate, and the like. The orthogonal vector coordinate system is a coordinate system in which a direction of magnetic poles of the rotor of the rotating electrical machine 80 is defined as one axis (d-axis) and a direction orthogonal to this axis (d-axis) is defined as the other axis (q-axis). The currents of the three phases (actual currents) that flow through the stator coils 81 are subjected to coordinate conversion in the orthogonal vector coordinate system based on the magnetic pole position. In the orthogonal vector coordinate system, computation of proportional-integral control (PI control) or proportional-integral-derivative control (PID control) is performed based on deviations between the current commands and the actual currents, thereby deriving voltage commands. The voltage commands are subjected to inverse coordinate conversion into voltage commands of the three phases based on the magnetic pole position. Thus, modulation pulses (switching control signals) are generated in accordance with a selected modulation scheme.

Figure 2:
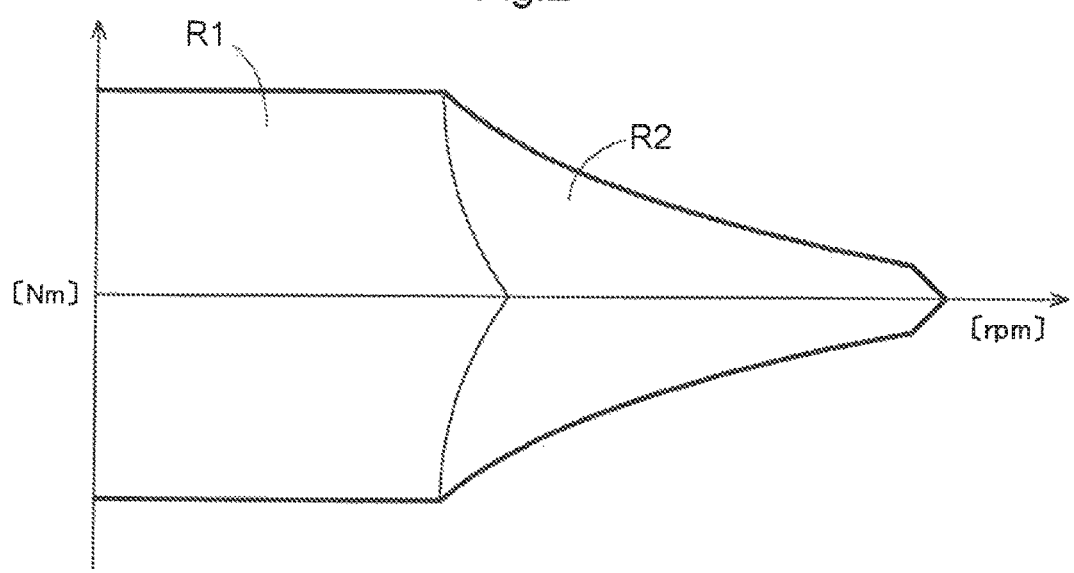
FIG. 2 is a diagram schematically illustrating operating ranges of a rotating electrical machine in accordance with a torque and a rotation speed.

As illustrated in, for example, FIG. 2, the operating range of the rotating electrical machine 80 extends over a wide range in accordance with the required torque ([Nm]) and the rotation speed ([rpm]). There are various types of modulation scheme for controlling the rotating electrical machine 80. Optimum modulation schemes differ depending on operating points to be defined based on the required torque and the rotation speed. In this embodiment, two different operating ranges are set as illustrated in FIG. 2. Different modulation schemes are employed in the respective operating ranges. A first operating range R1 is an operating range of a relatively low torque and a relatively low rotation speed. In this embodiment, three-phase modulation is performed. A second operating range R2 is an operating range of a relatively high torque and a relatively high rotation speed. In this embodiment, two-phase modulation is performed.

Details of the modulation schemes in the respective operating ranges are described later with reference to FIG. 5, FIG. 6, and the like.

As the modulation scheme of the inverter 10, pulse width modulation is known. In the pulse width modulation, a pulse is generated based on a magnitude relationship between the amplitude of an AC waveform serving as an output command (for example, a voltage command V* illustrated in FIG. 5 and FIG. 6) and the amplitude of a waveform of a carrier (for example, a carrier CR illustrated in FIG. 5 and FIG. 6) in the form of a triangular wave (including a sawtooth wave). A PWM waveform may directly be generated through digital computation rather than through comparison with the carrier. Also in this case, the amplitude of the AC waveform serving as a command value and the amplitude of an imaginary carrier waveform have a correlation therebetween. Unless otherwise rioted, the term "frequency of switching control signal" hereinafter refers to a frequency of the carrier. The pulse width modulation includes sinusoidal pulse width modulation (SPWM), space vector pulse width modulation (SVPWM), and discontinuous pulse width modulation (DPWM). The maximum modulation rates are "about 0.61" in the SPWM, "about 0.71" in the SVPWM, and "about 0.78" in the DPWM. In the ease of three-phase alternating currents as in this embodiment, a modulation scheme in which all the three phases are subjected to pulse width modulation is referred to as three-phase modulation, and a modulation scheme in which at least one phase out of the three phases is fixed during a predetermined period and the one or two remaining phases are subjected to pulse width modulation is referred to as two-phase modulation.

Prior to the description of each modulation scheme, the configuration of the inverter 10 of this embodiment is described. As illustrated in FIG. 1, in the inverter 10, the arms 9 are connected in parallel to each other between the DC positive terminal P and the DC negative terminal N in accordance with the number of phases of alternating currents of the plurality of phases, and the arms 9 for the respective phases each include two switch sections 2 that are connected in series and to be brought into conduction in an on state and out of conduction in an off state. The connection point between the two switch sections 2 of each arm 9 is an AC input or output point of each phase. In this embodiment, the connection point between the two switch sections 2 of the arm 9 for a corresponding one of the three phases is connected to a corresponding one of the star-connected stator coils 81 of the three phases of the rotating electrical machine 80.

Figure 3:
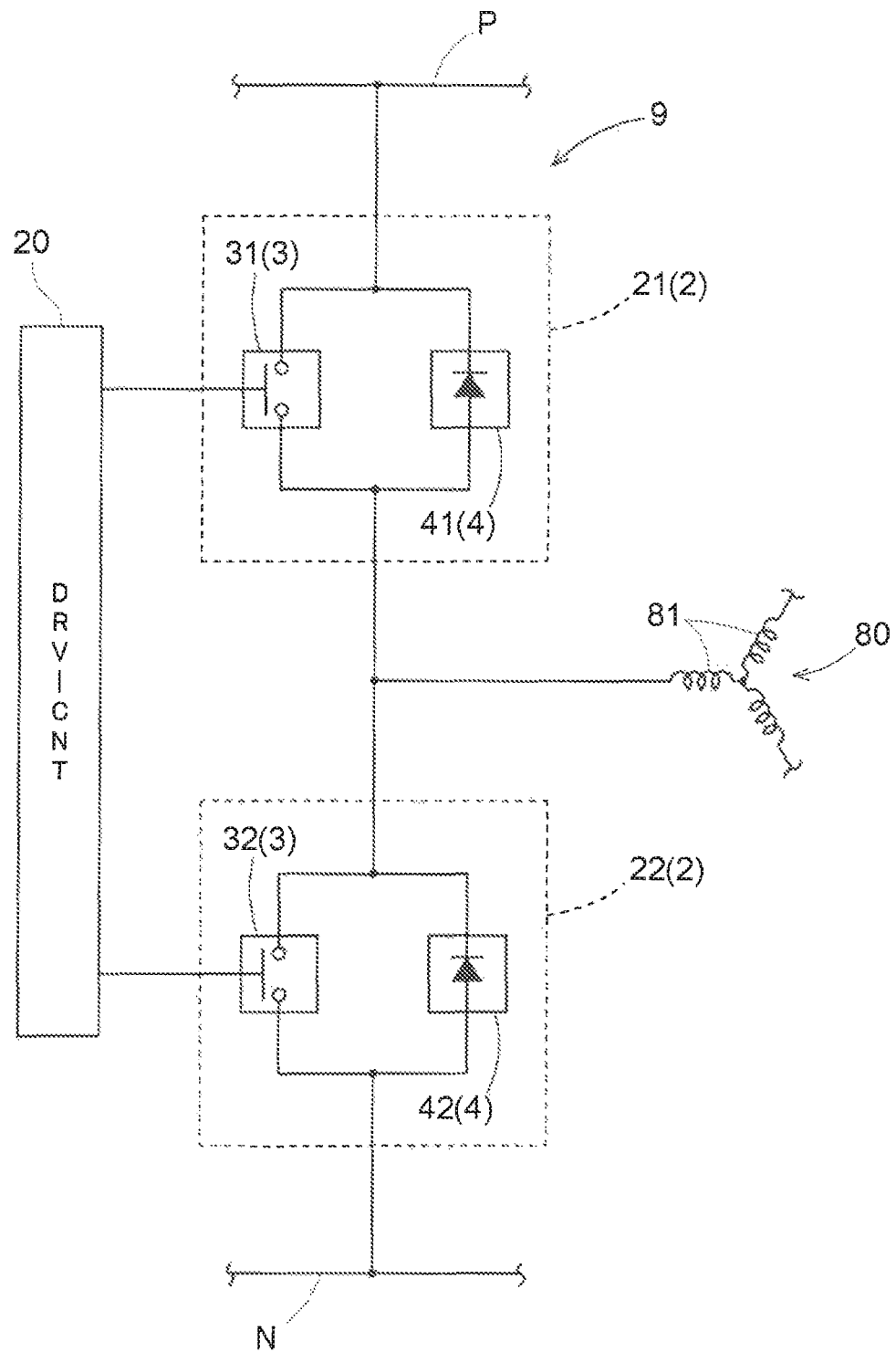
FIG. 3 is a circuit block diagram schematically illustrating the configuration of an arm for one phase.

As illustrated in FIG. 3, each switch section 2 includes the switching element 3 and the freewheeling diode 4. The freewheeling diode 4 is connected in parallel to the switching element 3 while a direction from the lower stage to the upper stage is set as a forward direction. In other words, the freewheeling diode 4 is connected in parallel (connected inversely in parallel) to the switching element 3 while a direction opposite to a conduction direction in a case where the switching element 3 is in the on state is set as a forward direction. The upper-stage switch section 21 includes an upper-stage switching element 31, and the lower-stage switch section 22 includes a lower-stage switching element 32. An upper-stage freewheeling diode 41 is connected inversely in parallel to the upper-stage switching element 31, and a lower-stage freewheeling diode 42 is connected inversely in parallel to the lower-stage switching element 32.

Figure 4:
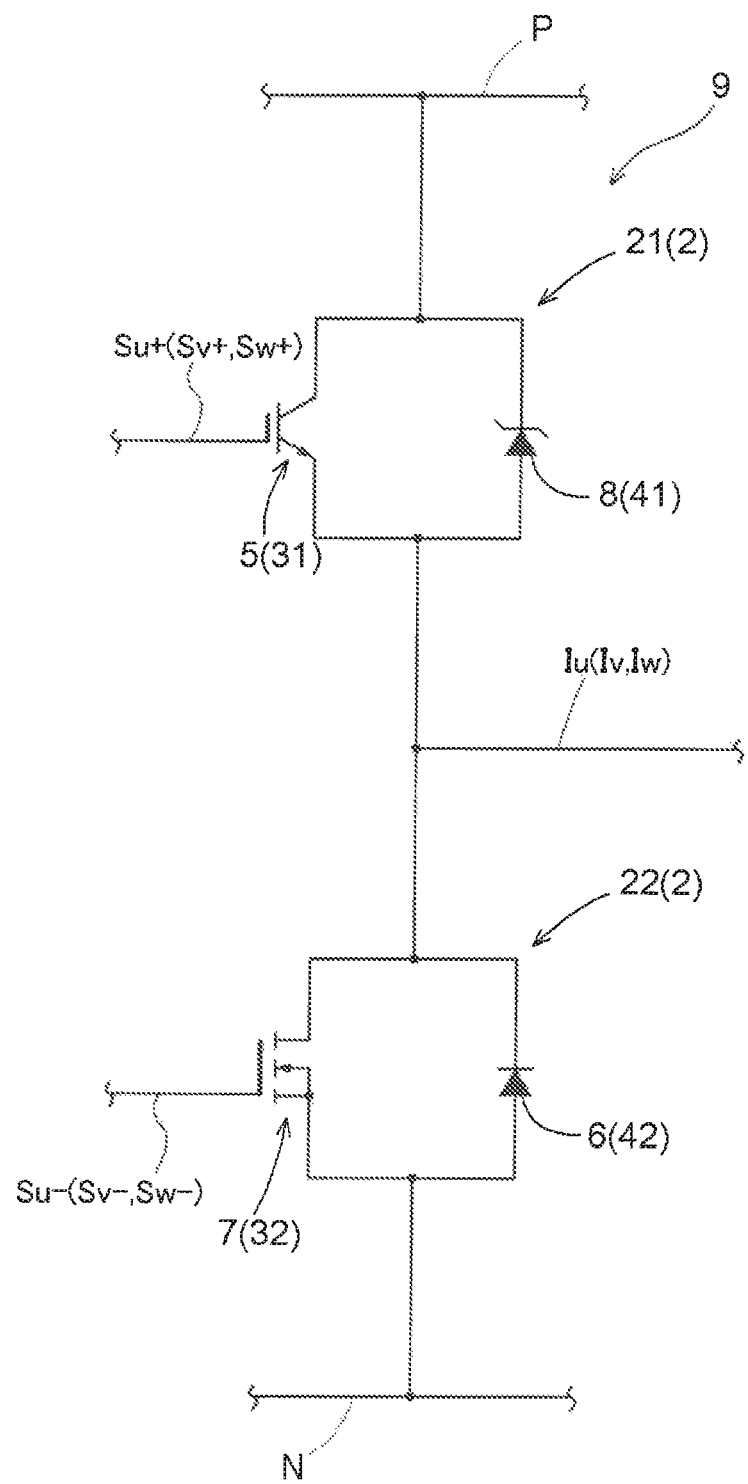
FIG. 4 is a schematic circuit diagram illustrating an example of the configuration of the arm for one phase.

As illustrated in FIG. 4, in this embodiment, the upper-stage switching element 31 is a first switching element 5 that is a Si-IGBT, and the lower-stage switching element 32 is a second switching element 7 that is a SiC-MOSFET. That is, the second switching element 7 is an element that is higher in a switching response than the first switching element 5. For example, the second. switching element 7 is an element that is shorter in a transition time between the off state and the on state than the first switching element 5 and is smaller in a turn-on/turn-off loss (switching loss) at the time of transition than the first switching element 5. The lower-stage freewheeling diode 42 is a first diode 6 (first rectifying element), and the upper-stage freewheeling diode 41 is a second diode 8 (second rectifying element) that is shorter in a reverse recovery time than the first diode 6. The second diode 8 may be an element that is smaller in a reverse recovery current than the first diode 6. That is, it is only necessary that the upper-stage freewheeling diode 41 be the second diode 8 that has better reverse recovery characteristics than the first diode 6. The phrase "good reverse recovery characteristics" means that the reverse recovery time is short or the reverse recovery current is small. That is, in the configuration exemplified in FIG. 4, the upper-stage switch section 21 is structured through parallel connection between the first switching element 5 and the second diode 8, and the lower-stage switch section 22 is structured through parallel connection between the second switching element 7 and the first diode 6.

In this embodiment, the first diode 6 is a p-n junction diode using Si as a substrate (preferably a fast recovery diode (Si-FRD)), and the second diode 8 is a Schottky barrier diode using SiC as a substrate (SiC-SBD). The fast recovery diode is a diode that is relatively short in the time in which a forward current continuously flows after the on state in which a forward voltage is applied is switched to the off state (reverse recovery time). The reverse recovery time of a general p-n junction diode is about several tens [μs] to a hundred [μs], whereas the reverse recovery time of the fast recovery diode is about 100 [nsec] or shorter. The Schottky barrier diode is a diode using rectification of Schottky junction (contact between a metal and a semiconductor) instead of p-n junction. In view of the operating principle, the reverse recovery time is not present in the Schottky barrier diode, and a higher-speed operation is possible as compared to the fast recovery diode. A Schottky barrier diode using Si as a substrate has a problem with the withstand voltage, but the Schottky barrier diode using SiC as a substrate achieves a higher withstand voltage.

Each modulation scheme is described below. As described above, in this embodiment, two modulation schemes are selectively applied in accordance with the modulation rate. In a case of a relatively low modulation rate and a medium modulation rate, the three-phase modulation is performed. In a case of a high modulation rate, the two-phase modulation is performed. The two-phase modulation is performed at a higher modulation frequency than that of the three-phase modulation. For example, the three-phase modulation is performed at a carrier frequency f1 [Hz], and the two-phase modulation is performed at a carrier frequency f2 [Hz]. In this case, "f1<f2" is satisfied. FIG. 5 is a waveform diagram illustrating an example of modulation at a low modulation rate, and FIG. 6 is a waveform diagram illustrating an example of modulation at a high modulation rate.

Figure 5:
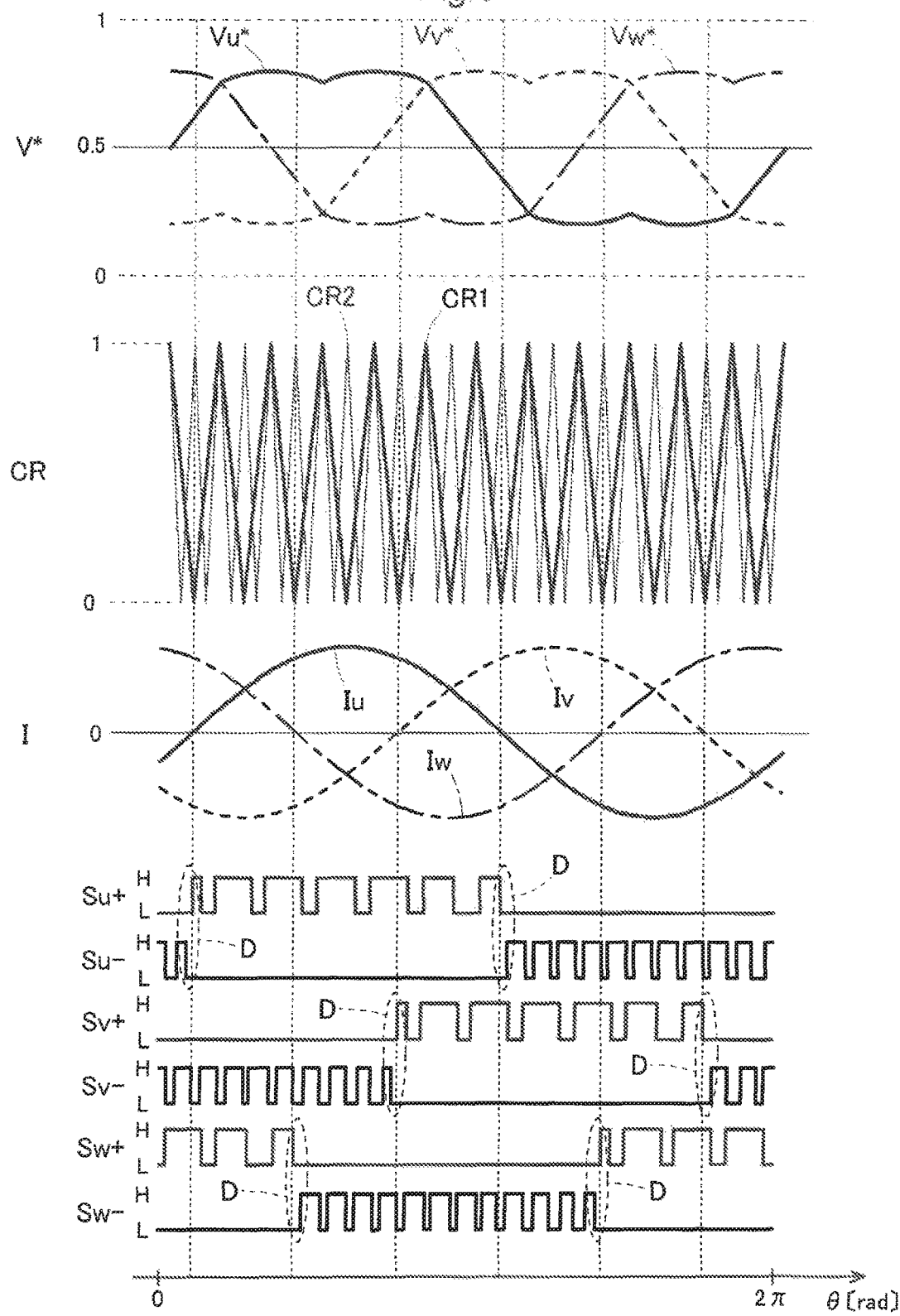
FIG. 5 is a waveform diagram illustrating an example of modulation at a low modulation rate.
Figure 6:
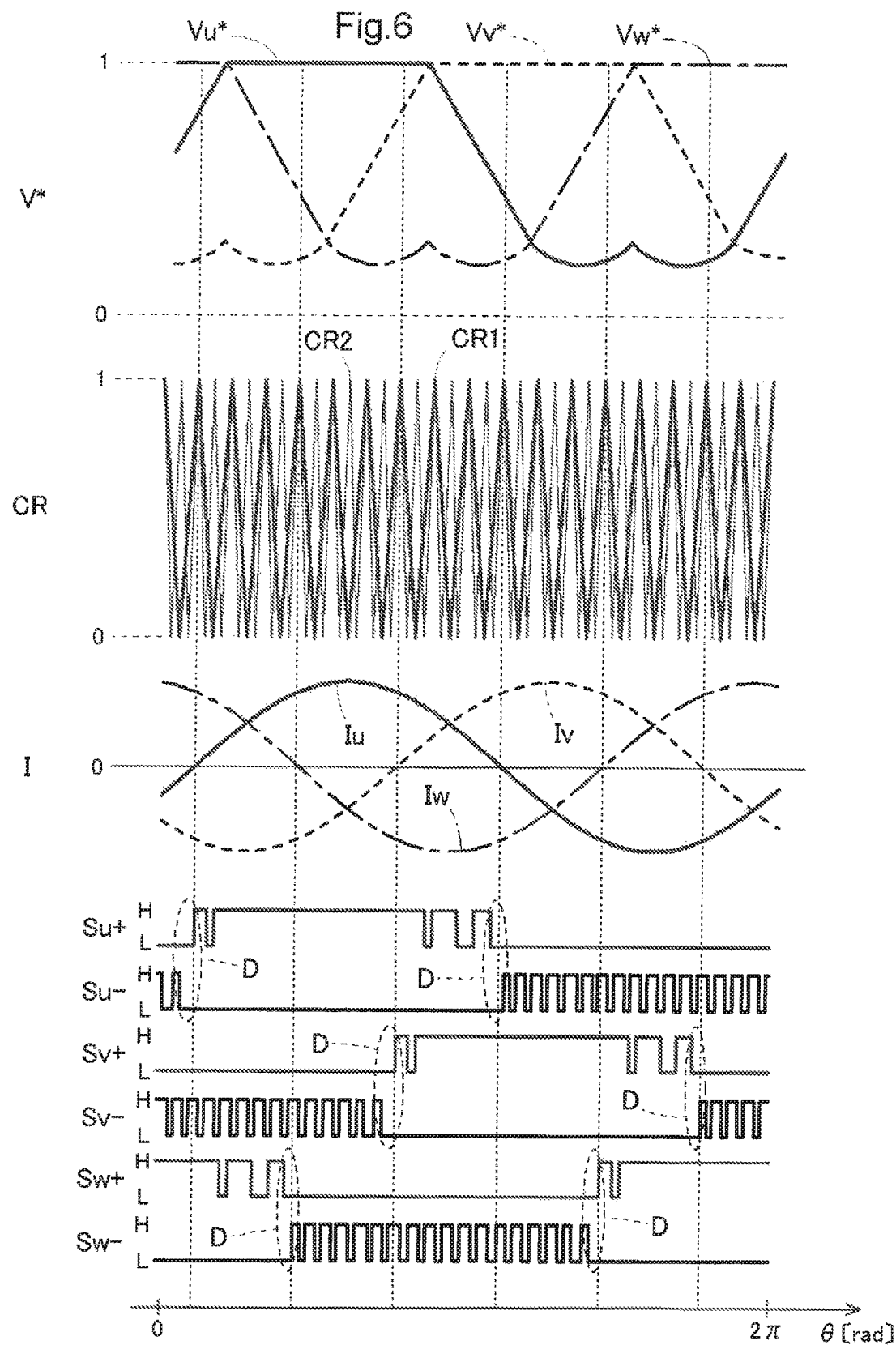
FIG. 6 is a waveform diagram illustrating an example of modulation at a high modulation rate.

FIG. 5 and FIG. 6 each illustrate the voltage command V*, the carrier CR, a three-phase current I (target value, command value), and a modulation pulse (switching control signal) in the order from the upper part. A modulation pulse is generated through comparison between the voltage command V* and the carrier CR. In this embodiment, the frequency of the carrier CR (carrier frequency) is set so that the frequency of the switching control signal (Su−, Sv−, Sw−) for the second switching element 7 (SiC-MOSFET) is higher than the frequency of the switching control signal (Su+, Sv+, Sw+) for the first switching element 5 (Si-IGBT). In this embodiment, the second switching element 7 (SiC-MOSFET) that is relatively small in the switching loss and is high in the switching response is the lower-stage switching element 32. Thus, FIG. 5 and FIG. 6 each exemplify a form in which the frequency of a second carrier CR2 at the lower stage is twice as high as that of a first carrier CR1 at the upper stage. Unless otherwise noted, the frequency of the carrier that is relatively lower (first carrier CR1 in this case) is hereinafter defined as the reference frequency "f1" or "f2" of each modulation scheme.

FIG. 5 and FIG. 6 each exemplify the form in which the frequency of the second carrier CR2 is twice as high as that of the first carrier CR1, but the frequency of the second carrier CR2 may be equal to that of the first carrier CR1, or different multiplying factors may be employed. For example, it is preferable that the frequency of the second carrier CR2 be about four to eight times as high. as the frequency of the first carrier CR1. The multiplying factor need not be fixed. For example, the second carrier CR2 is variable within a range of f1 [Hz] to fx [Hz] at a low modulation rate, and is variable within a range of f2 [Hz] to fy [Hz] at a high modulation rate. In this case, "fx<fy" is satisfied.

As is apparent from FIG. 5 and FIG. 6, during one cycle of an electrical angle, any one phase out of the three phases is definitely modulated by a high-speed carrier (second carrier CR2 in this case). Therefore, the frequency of an inter-phase voltage of the three-phase alternating currents can be increased in accordance with the carrier frequency of the high-speed carrier (second carrier CR2). Thus, it is preferable that the frequency of the high-speed carrier (second carrier CR2 in this case) for generating at least the switching control signal for the second switching element 7 have a variable value. In other words, it is preferable that the frequency of the switching control signal for the second switching element 7 have a variable value.

When the frequency of the inter-phase voltage of the three-phase alternating currents can be increased, pulsation of the three-phase AC waveforms is reduced, and distortion is also reduced. Consequently, the loss of the rotating electrical machine 80 to which AC power is supplied by the inverter 10 is reduced, whereby the efficiency is improved. That is, the loss of the entire system is reduced, whereby efficiency can be improved. Further, pulsation of the DC link voltage is reduced. Therefore, the capacitance of the smoothing capacitor 12 that smooths the DC link voltage can be reduced, whereby downsizing can be achieved. It is preferable that the frequency be increased by using the second switching element 7 that is capable of performing higher-speed switching and is smaller in the switching loss. Thus, the switching frequency of the first switching element 5 need not have a variable value. The loss is increased when the switching frequency of the first switching element 5 that is relatively large in the switching loss is increased. Therefore, it is preferable that the frequency of the low-speed carrier (first carrier CR1 in this case) for generating at least the switching control signal for the first switching element 5 have a fixed value. In other words, it is preferable that the frequency of the switching control signal for the first switching element 5 have a fixed value.

When the alternating current (Iu, Iv, Iw) of each of the three phases is positive with respect to the amplitude center, and when the upper-stage switching element 31 is in the on state, the current flows in a reverse direction with respect to the upper-stage freewheeling diode 41 through the upper-stage switch section 21 of the arm 9 corresponding to the current of the phase. Thus, the current does not flow through the upper-stage freewheeling diode 41. When the upper-stage switching element 31 is in the off state, the current does not flow through the upper-stage switching element 31 and the upper-stage freewheeling diode 41. Therefore, when the alternating current (Iu, Iv, Iw) is positive, and when the upper-stage switching element 31 is in the off state, the current flows in a forward direction with respect to the lower-stage freewheeling diode 42 through the lower-stage switch section 22 of the arm 9 corresponding to the current of the phase. Thus, the current flows through the lower-stage freewheeling diode 42. When the upper-stage switching element 31 is in the on state (when the lower-stage switching element 32 is in the off state), the current does not flow through the lower stage of the arm 9.

That is, in a phase angle in which the alternating current (Iu, Iv, Iw) is positive, when the current flows through the lower-stage switch section 22 of the arm 9 corresponding to the current of the phase, the current flows in the forward direction with respect to the lower-stage freewheeling diode 42. Thus, when the alternating current (Iu, Iv, Iw) is positive, the lower-stage switch section 22 of the arm 9 corresponding to the current of the phase can be energized at an appropriate timing through the lower-stage freewheeling diode 42 without complementarily switching the upper stage.

Similarly, when the alternating current (Iu, Iv, Iw) of each of the three phases is negative with respect to the amplitude center, and when the lower-stage switching element 32 is in the on state, the current flows in a reverse direction with respect to the lower-stage freewheeling diode 42 through the lower-stage switch section 22 of the arm 9 corresponding to the current of the phase. When the lower-stage switching element 32 is in the off state, the current does not flow. When the lower-stage switching element 32 is in the off state, the current flows in a forward direction with respect to the upper-stage freewheeling diode 41 through the upper-stage switch section 21 of the arm 9 corresponding to the current of the phase. When the lower-stage switching element 32 is in the on state, the current does not flow through the upper-stage switch section 21 of the arm 9. That is, in a phase angle in which the alternating current (Iu, Iv, Iw) is negative, when the current flows through the upper-stage switch section 21 of the arm 9 corresponding to the current of the phase, the current flows in the forward direction with respect to the upper-stage freewheeling diode 41. Thus, when the alternating current (Iu, Iv, Iw) is negative, the upper-stage switch section 21 of the arm 9 corresponding to the current of the phase can be energized at an appropriate timing through the upper-stage freewheeling diode 41 without complementarily switching the lower-stage switch section 22.

Through the consideration described above, during a period in which the forward current flows through the freewheeling diode 4 of each arm 9, the switching element 3 connected in parallel to the freewheeling diode 4 can constantly be kept in the off state. The number of switching operations of the switching element 3 is reduced, whereby the loss of the entire inverter 10 can be reduced.

In this embodiment, as illustrated in FIG. 5 and FIG. 6, during a period in which the U-phase current is positive, the U-phase lower-stage switching control signal Su− is constantly kept in an ineffective state (low state "L"). During a period in which the U-phase current is negative, the U-phase upper-stage switching control signal Su+ is constantly kept in the ineffective state (L). Similarly, during a period in which the V-phase current is positive, the V-phase lower-stage switching control signal Sv− is constantly kept in the ineffective state (L). During a period in which the V-phase current is negative, the V-phase upper-stage switching control signal Sv+ is constantly kept in the ineffective state (L). Similarly, during a period in which the W-phase current is positive, the W-phase lower-stage switching control signal Sw− is constantly kept in the ineffective state (L). During a period in which the W-phase current is negative, the W-phase upper-stage switching control signal Sw+ is constantly kept in the ineffective state (L).

In the control of the inverter 10, a dead time in which both the switching elements (31 and 32) are in the off state is provided so that the upper-stage switching element 31 and the lower-stage switching element 32 of each arm 9 are not in the on state simultaneously. The length of the dead time is a bottleneck in increasing the switching frequency. As described above, during a period in which the forward current flows through the freewheeling diode 4 of each arm 9, the switching element 3 connected in parallel to the freewheeling diode 4 is controlled constantly in the off state. This allows reducing the need to consider the dead time in each arm 9. Through the reduction in the dead time to be considered, the switching frequency can be increased.

In the pulse patterns of FIG. 5 and FIG. 6, a portion represented by a reference symbol "D" is a timing when the positive/negative polarity of the alternating current (Iu, Iv, Iw) of each of the three phases is reversed across the amplitude center (zero crossing timing). At this timing, the switching element to be subjected to switching control is changed between the upper-stage switching element 31 and the lower-stage switching element 32. Therefore, the dead time is set only at this timing.

As described above, in any one phase out of the three phases, the second switching element 7 that is high in the switching response (short in the transition time) and is small in the switching loss is definitely switched by the switching control signal having a high frequency, which is modulated by the high-speed carrier (second carrier CR2 in this case). When the second switching element 7 is switched to the off state by the switching control signal having a high frequency, the current flows through the second diode 8 connected in parallel to the first switching element 5 of the same arm 9. The second diode 8 is an element that has good reverse recovery characteristics, namely, a short reverse recovery time, a small reverse recovery current, or the like. That is, in a phase angle (period) in which the switching is performed at a high frequency, the element that has better switching characteristics out of the two elements at the upper stage and the lower stage of each arm 9 operates, and the element that has poorer switching characteristics out of the two elements at the upper stage and the lower stage of the arm 9 does not operate. In general, the element that has good switching characteristics tends to be more expensive, and is therefore arranged so as to operate only when a high-speed operation is necessary. Thus, the increase in the cost along with the increase in the frequency of the inverter 10 can be suppressed.

2. Second Embodiment

Figure 7:
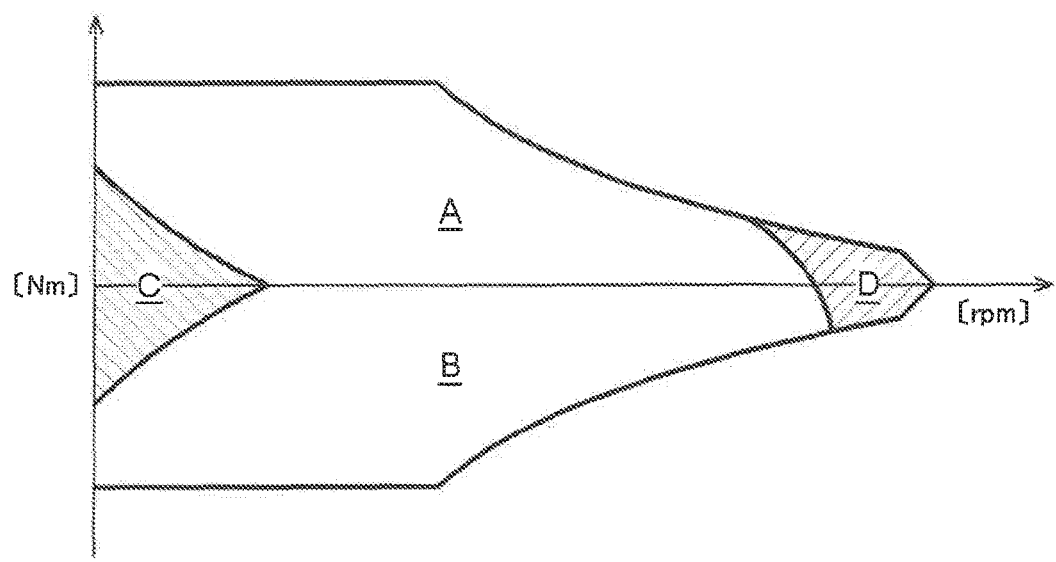
FIG. 7 is a diagram schematically illustrating operating ranges of a rotating electrical machine according to a second embodiment.

Next, a second embodiment of the power conversion device 1 is described. As illustrated in FIG. 7, this embodiment is different from the first embodiment described above in that four different operating ranges A to D are set and different modulation schemes are employed in the respective operating ranges. Further, this embodiment is different from the first embodiment described above in that both of the frequency of the switching control signal for the first switching element 5 and the frequency of the switching control signal for the second switching element 7 have variable values. With those differences, the power conversion device 1 of this embodiment is structured such that the loss of the system can further be reduced as compared to the first embodiment described above. Also in this embodiment, the second switching element 7 (SiC-MOSFET) that is relatively small in the switching loss and is high in the switching response is the lower-stage switching element 32. The differences between the power conversion device 1 according to this embodiment and the power conversion device 1 according to the first embodiment described above are mainly described below. The features that are not particularly described may be similar to those of the first embodiment described above.

In this embodiment, as illustrated in FIG. 7, the four different operating ranges that are the range A, the range B, the range C, and the range D are set in accordance with the required torque and the rotation speed of the rotating electrical machine 80, and different modulation schemes are applied in the respective operating ranges. The range A is a range in which the torque is "positive" and the modulation rate is relatively higher than that of the range C, that is, an operating range in which the torque is high and the rotation speed is also high. In the range A, a high duty-side fixing two-phase modulation scheme is applied. The range B is a range in which the torque is "negative" and the modulation rate is relatively higher than that of the range C, that is, an operating range in which the torque is low (the absolute value of the negative torque is higher than that of the range C) and the rotation speed is high. In the range B, a low duty-side fixing two-phase modulation scheme is applied. The high duty-side fixing two-phase modulation scheme and the low duty-side fixing two-phase modulation scheme may hereinafter collectively be referred to simply as a two-phase modulation scheme. The range C is a range in which the modulation rate is relatively lower than those of the range A and the range B, that is, an operating range in which the absolute value of the torque is low and the rotation speed is also low. In the range C, a three-phase modulation scheme is applied. The range D is a range in which the modulation rate is relatively higher than those of the range A and the range B, that is, an operating range in which the rotation speed is high. In the range D, a rectangular wave control scheme is applied. FIG. 7 illustrates an example in which the operating ranges A to D are set in accordance with the required torque and the rotation speed of the rotating electrical machine 80. Those ranges are basically determined based on the modulation rate. Thus, the operating ranges A to D may simply be set in accordance with the modulation rate. The modulation schemes of the respective operating ranges are described below.

In the two-phase modulation scheme, modulation is performed at a higher modulation frequency than that of the three-phase modulation scheme. In the arm of each phase, the frequency of the switching control signal for the second switching element 7 is equal to or higher than the frequency of the switching control signal for the first switching element 5. In this embodiment, both of the frequency of the switching control signal for the first switching element 5 and the frequency of the switching control signal for the second switching element 7 have variable values. Thus, for example, in the three-phase modulation scheme, the frequency of the switching control signal for the first switching element 5 is a value within a range of "f1 to fx1",and the frequency of the switching control signal for the second switching element 7 is a value within a range of "f1 to fx2". In the two-phase modulation scheme, the frequency of the switching control signal for the first switching element 5 is a value within a range of "f2 to fy1",and the frequency of the switching control signal for the second switching element 7 has a value within a range of "f2 to fy2". Note that "f1<f2", "fx1 <fx2",and "fy1<fy2" are satisfied. In the three-phase modulation scheme, the value of the frequency of the switching control signal for the second switching element 7 is equal to or higher than that of the frequency of the switching control signal for the first switching element 5. In the two-phase modulation scheme, the value of the frequency of the switching control signal for the second switching element 7 is higher than that of the frequency of the switching control signal for the first switching element 5. In other words, the value of the frequency of the switching control signal for the second switching element 7 is higher than that of the frequency of the switching control signal for the first switching element 5 at least in the two-phase modulation scheme. That is, there is an operating state in which the frequency of the switching control signal for the second switching element 7 is higher than the frequency of the switching control signal for the first switching element 5.

The high duty-side fixing two-phase modulation scheme to be applied in the range A is the same as the two-phase modulation scheme illustrated in FIG. 6 according to the first embodiment described above. That is, the high duty-side fixing two-phase modulation scheme is a control scheme in Which the voltage command V* of one phase out of the voltage commands V* of the three phases is fixed to a high-duty side during a predetermined period and the voltage commands V* of the two remaining phases are subjected to pulse width modulation. In the example illustrated in FIG. 6, the voltage command V* of one phase out of the voltage commands V* of the three phases is fixed to a duty of 100% (constantly on) during a period corresponding to an electrical angle of 120°. Specifically, during a period in which the U-phase current is positive, the U-phase lower-stage switching control signal Su− is constantly kept in the ineffective state (low state "L"). During a predetermined period within that period (during a period corresponding to an electrical angle of 120°), the U-phase upper-stage switching control signal Su+ is kept in an effective state (high state "H"). During a period in which the U-phase current is negative, the U-phase upper-stage switching control signal Su+ is constantly kept in the ineffective state (L), and the U-phase lower-stage switching control signal Su− is subjected to switching control at a high frequency. FIG. 6 illustrates an example in which the frequency of the second carrier CR2 at the lower stage is twice as high as that of the first carrier CR1 at the upper stage and the frequency of the switching control signal for the second switching element 7 is twice as high as the frequency of the switching control signal for the first switching element 5. It is only necessary that the frequency of the switching control signal for the second switching element 7 be twice or more as high as the frequency of the switching control signal for the first switching element 5. For example, it is preferable that the frequency of the switching control signal for the second switching element 7 be about four to eight times as high as the frequency of the switching control signal for the first switching element 5. Thus, in this example, the U-phase lower-stage switching control signal Su− is turned on and off at a frequency that is twice or more as high as that of the U-phase upper-stage switching control signal Su+. Similar control is performed on the V phase and the W phase.

Figure 8:
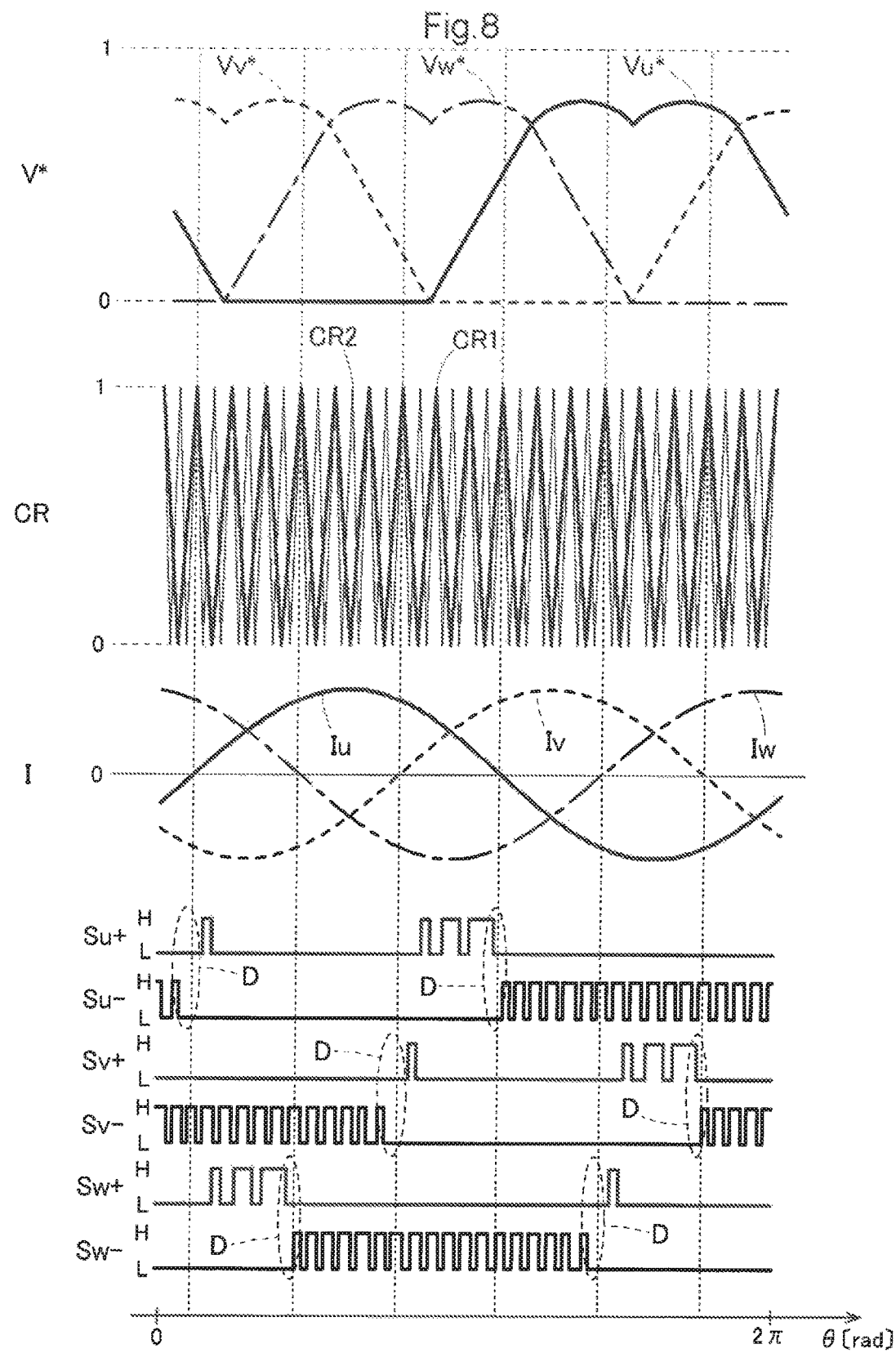
FIG. 8 is a waveform diagram illustrating an example of modulation in a range B of FIG. 7.

FIG. 8 is a waveform diagram illustrating an example of modulation in the low duty-side fixing two-phase modulation scheme to be applied in the range B. As illustrated in FIG. 8, the low duty-side fixing two-phase modulation scheme is a control scheme in which the voltage command V* of one phase out of the voltage commands V* of the three phases is fixed to a low-duty side during a predetermined period and the voltage commands V* of the two remaining phases are subjected to pulse width modulation. In the example illustrated in FIG. 8, the voltage command V* of one phase out of the voltage commands V* of the three phases is fixed to a duty of 0% (constantly off) during a period corresponding to an electrical angle of 120°. Specifically, during a period in which the U-phase current is positive, the U-phase lower-stage switching control signal Su− is constantly kept in the ineffective state (low state "L"). During a predetermined period within that period (during a period corresponding to an electrical angle of 120°), the U-phase upper-stage switching control signal Su+ is also kept in the ineffective state. During a period in which the U-phase current is negative, the U-phase upper-stage switching control signal Su+ is constantly kept in the ineffective state (L), and the U-phase lower-stage switching control signal Su− is subjected to switching control at a high frequency. FIG. 8 illustrates an example in which the frequency of the second carrier CR2 at the lower stage is twice as high as that of the first carrier CR1 at the upper stage and the frequency of the switching control signal for the second switching element 7 is twice as high as the frequency of the switching control signal for the first switching element 5. It is only necessary that the frequency of the switching control signal for the second switching element 7 be twice or more as high as the frequency of the switching control signal for the first switching element 5. For example, it is preferable that the frequency of the switching control signal for the second switching element 7 be about four to eight times as high as the frequency of the switching control signal for the first switching element 5. Thus, in this example, the U-phase lower-stage switching control signal Su− is turned on and off at a frequency that is twice or more as high as that of the U-phase upper-stage switching control signal Su+. Similar control is performed on the V phase and the W phase.

As described above, in both of the high duty-side fixing two-phase modulation scheme of the range A and the low duty-side fixing two-phase modulation scheme of the range B, the second switching element 7 that is relatively small in the switching loss and is high in the switching response is mainly switched. When the second switching element 7 is switched to the off state by the switching control signal having a high frequency, the current flows through the second diode 8 connected in parallel to the first switching element 5 of the same arm 9. As described above, the second diode 8 is an element that has good reverse recovery characteristics. That is, in a phase angle (period) in which the switching is performed at a high frequency, the element that has better switching characteristics out of the two elements at the upper stage and the lower stage of each arm 9 operates, and the element that has poorer in the switching characteristics out of the two elements at the upper stage and the lower stage of the arm 9 does not operate. In general, the element that has good switching characteristics tends to be more expensive, and is therefore arranged so as to operate only when a high-speed operation is necessary. Thus, the increase in the cost along with the increase in the frequency of the inverter 10 can be suppressed.

Figure 9:
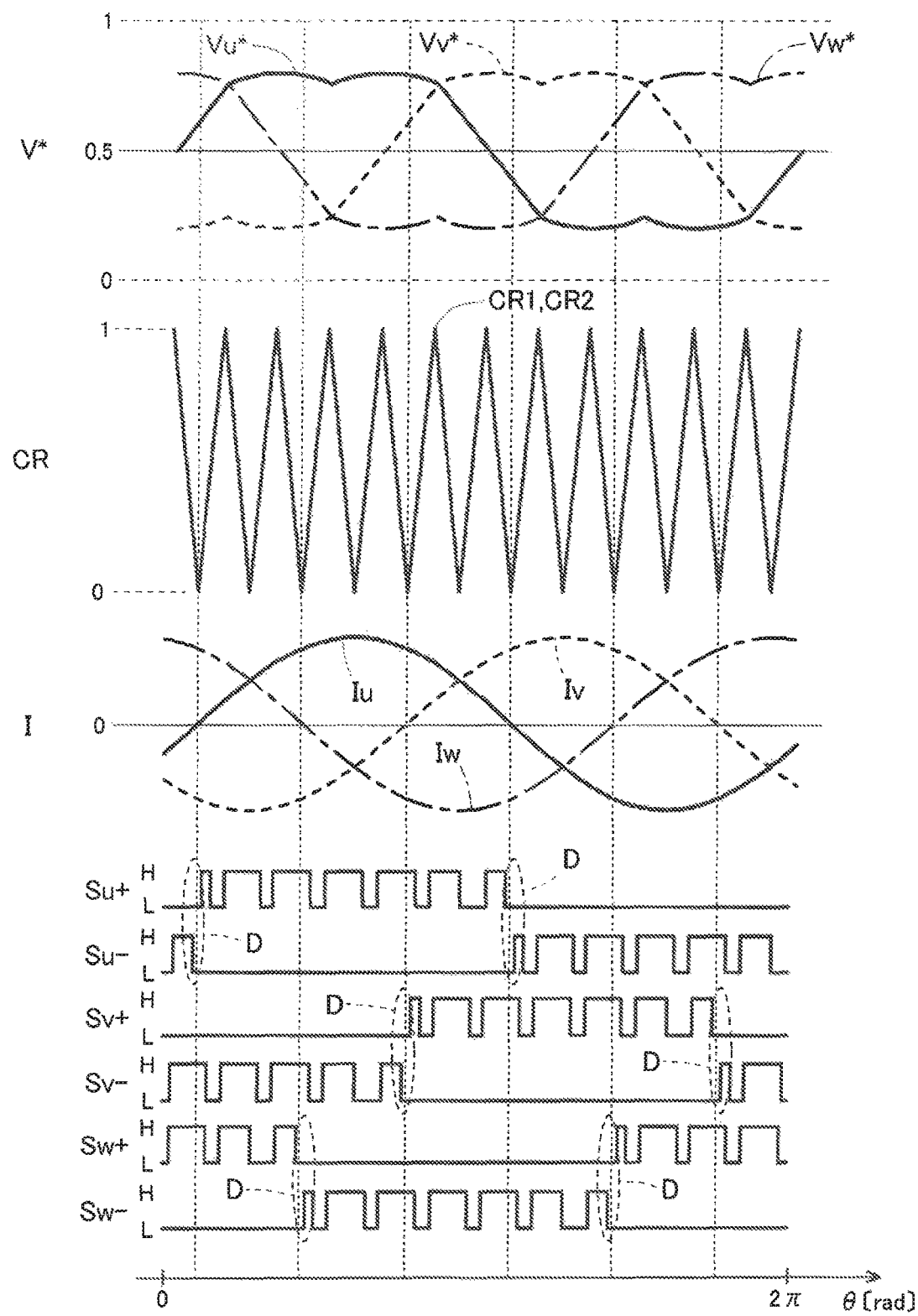
FIG. 9 is a waveform diagram illustrating an example of modulation in a range C of FIG. 7.

FIG. 9 is a waveform diagram illustrating an example of modulation in the three-phase modulation scheme to be applied in the range C. As illustrated in FIG. 9, the three-phase modulation. scheme is a control scheme in which all the three phases are subjected to pulse width modulation. Specifically, during a period in which the U-phase current is positive, the U-phase lower-stage switching control signal Su− is constantly kept in the ineffective state (low state "L"), and the U-phase upper-stage switching control signal Su+ is subjected to switching control at a predetermined frequency. During a period in which the U-phase current is negative, the U-phase upper-stage switching control signal Su+ is constantly kept in the ineffective state (L), and the U-phase lower-stage switching control signal Su− is subjected to switching control at a predetermined frequency. This feature is similar to that of FIG. 5 according to the first embodiment described above. In the example illustrated in FIG. 9, the frequency of the first carrier CR1 at the upper stage and the frequency of the second carrier CR2 at the lower stage are equal to each other, and the value of the frequency of the switching control signal for the first switching element 5 and the value of the frequency of the switching control signal for the second switching element 7 are equal to each other. The frequency of the switching control signal in the range C is lower than those of the range A and the range B.

The range C is the operating range in which the absolute value of the torque is relatively lower than those of the range A and the range B and the rotation speed is also lower. Therefore, the current flowing through the rotating electrical machine 80 is also small. Thus, even when both of the first switching element 5 and the second switching element 7 are switched. at low switching frequencies, the loss of the rotating electrical machine 80 due to a ripple current or the like is smaller than those of the range A and the range B. Accordingly, in this embodiment, the switching frequency of the second switching element 7 is set as low as that of the first switching element 5. Also in the range C, the switching frequency of the second switching element 7 may be set higher than the switching frequency of the first switching element 5. The reason why the three-phase modulation scheme is employed in the range C is as follows. The current flowing through the rotating electrical machine 80 is small, and the duties of the first switching element 5 and the second switching element 7 are low. Therefore, the two-phase modulation scheme cannot be employed as in the range A and the range B.

In the two-phase modulation scheme and the three-phase modulation scheme to be applied in the range A, the range B, and the range C, similarly to the first embodiment described above, during a period in which the forward current flows through. the freewheeling diode 4 of each arm 9, the switching element 3 connected in parallel to the freewheeling diode 4 is controlled constantly in the off state. The dead time is set only at a portion represented by a reference symbol "D" in FIG. 6, FIG. 8, and FIG. 9, that is, at a timing when the positive/negative polarity of the alternating current of each of the three phases (Iu, Iv, and Iw) is reversed (zero crossing timing).

Although a waveform diagram is omitted, the rectangular wave control scheme to be applied in the range D is a scheme in which the inverter 10 is controlled by controlling a voltage phase angle of the AC power. The voltage phase angle of the AC power corresponds to a phase angle of each of the three-phase voltage commands V*. In this embodiment, the rectangular wave control is rotational synchronization control in which the first switching element 5 and the second switching element 7 of the inverter 10 are turned on and off once per cycle of the electrical angle of the rotating electrical machine 80 and one pulse per cycle of the electrical angle is output in each phase. In general, the rectangular wave control is performed together with field weakening control.

Figure 10:
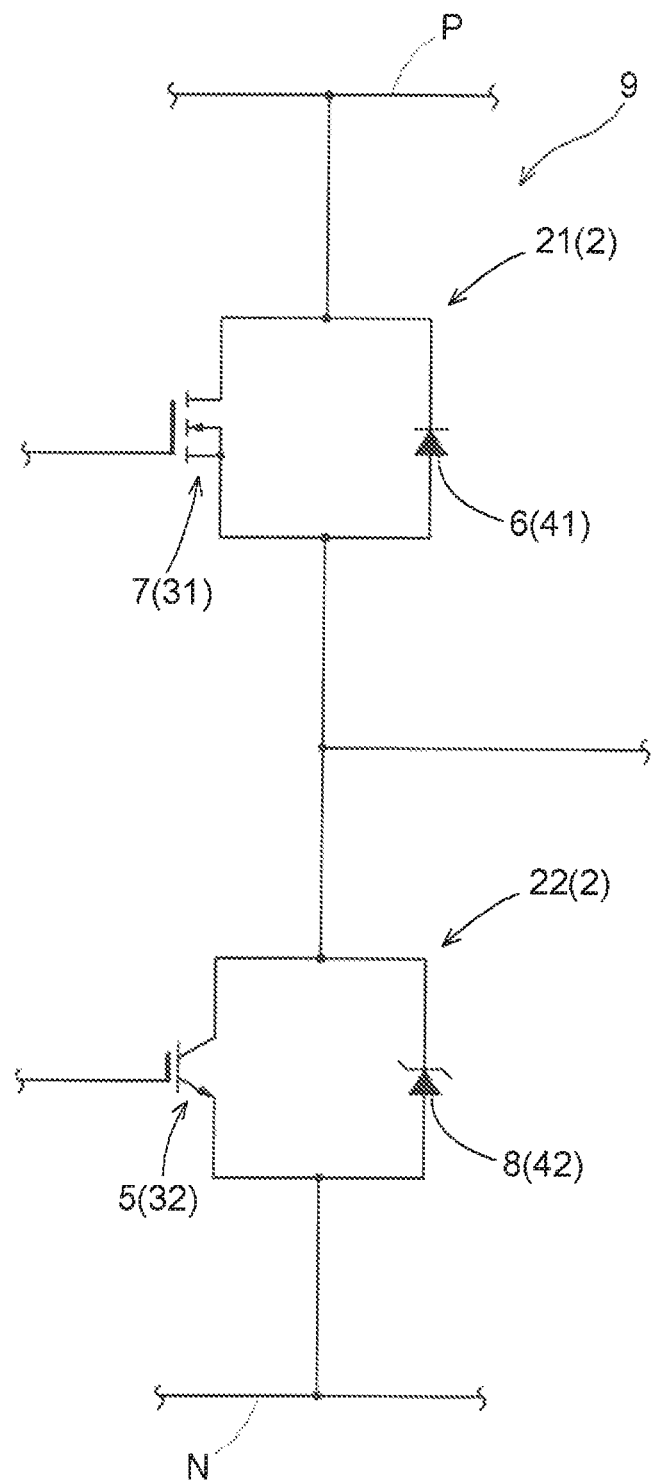
FIG. 10 is a schematic circuit diagram illustrating another configuration of the arm for one phase.

3. Other Embodiments (1) In the embodiments described above, as illustrated in FIG. 4, description is given of the exemplary configuration in which the upper-stage switching element 31 is the first switching element 5, the upper-stage freewheeling diode 41 is the second diode 8, the lower-stage switching element 32 is the second switching element 7, and the lower-stage freewheeling diode 42 is the first diode 6. As illustrated in FIG. 10, however, the structures of the upper-stage switch section 21 and the lower-stage switch section 22 may be reversed. That is, the upper-stage switching element 31 may be the second switching element 7, the upper-stage freewheeling diode 41 may be the first diode 6, the lower-stage switching element 32 may be the first switching element 5, and the lower-stage freewheeling diode 42 may be the second diode 8. In other words, in each arm 9, it is only necessary that one switch section 2 out of the upper-stage switch section 21 and the lower-stage switch section 22 be structured through parallel connection between the first switching element 5 and the second diode 8, and that the other switch section 2 be structured through parallel connection between the second switching element 7 and the first diode 6.

When each arm 9 is structured as illustrated in FIG. 10, the frequencies of the first carrier CR1 and the second carrier CR2 illustrated in FIG. 5 and FIG. 6 are reversed. Therefore, the frequencies of the switching control signals of each phase are also reversed. In the examples illustrated in FIG. 5 and FIG. 6, the frequency of the switching control signal for the lower-stage switching element 32 (Su−, Sv−, Sw−) is higher than that of the switching control signal for the upper-stage switching element 31 (Su+, Sv+, Sw+). When each arm 9 is structured as illustrated in FIG. 10, however, the frequency of the switching control signal for the upper-stage switching element 31 (Su+, Sv+, Sw+) is higher than that of the switching control signal for the lower-stage switching element 32 (Su−, Sv−, Sw−). In the case of the second embodiment described above, it is appropriate that the control scheme be changed between the range A in which the torque is "positive" and the range B in which the torque is "negative" to apply the low duty-side fixing two-phase modulation scheme in the range A and the high duty-side fixing two-phase modulation scheme in the range B so that the second switching element 7 that is relatively small in the switching loss and is high in the switching response is mainly switched. The other features may easily be understood from the description above with reference to FIG. 3 to FIG. 6, and therefore detailed description is omitted.

(2) As described above, as the frequency of the switching control signal is higher, the waveform of the generated alternating current is closer to a sinusoidal wave, whereby pulsation and distortion of the waveform are reduced. Allowable ranges of pulsation and distortion differ depending on the forms and conditions of use of the power conversion device 1.

As one aspect, it is preferable that the frequency of the switching control signal be set in accordance with the speed and the torque of the rotating electrical machine 80 to be driven via the power conversion device 1, the modulation rate between the direct current and the alternating current, and the like. That is, it is preferable that the frequency of the switching control signal be set in accordance with at least one of the speed of the rotating electrical machine 80, the torque (required torque) of the rotating electrical machine 80, and the modulation rate from the direct current to the alternating current.

For example, it is preferable that the frequency of the switching control signal be set so as to decrease as the torque (required torque) of the rotating electrical machine 80 increases. Further, it is preferable that the frequency of the switching control signal be set so as to increase as the speed of the rotating electrical machine 80 increases. Further, it is preferable that the frequency of the switching control signal be set so as to decrease as the modulation rate increases. When the frequency is set based on two or more of the torque of the rotating electrical machine 80, the rotation speed of the rotating electrical machine, and the modulation rate, it is preferable to provide a map or the like that defines relationships between those parameters and the frequency.

In the above, description is given of the exemplary configuration in which the rotating electrical machine 80 serving as a source of a driving force for a hybrid vehicle or an electric vehicle is driven. The rotating electrical machine 80 may drive a compressor of an air conditioner or an oil pump.

(3) In the embodiments described above, description is given of the exemplary case where the frequency of the switching control signal is equal to the frequency of the carrier, However, the configuration of the power conversion device 1 is not limited to this configuration, but may be a configuration in which the frequency of the switching control signal is different from the frequency of the carrier. For example, it is preferable to employ a configuration in Which a fraction of the carrier frequency by a natural number is set as the frequency of the switching control signal. In this case, a common carrier (same frequency) may be set as the first carrier CR1 for the first switching element 5 and the second carrier CR2 for the second switching element 7, the frequency of the switching control signal for the first switching element 5 may be set as 1/N (N is a natural number) of the common carrier frequency, and the frequency of the switching control signal for the second switching element 7 may be set as 1/M (M is a natural number, provided that M≤N is satisfied) of the common carrier frequency. Thus, the frequency of the switching control signal for the second switching element 7 can be set equal to or higher than the frequency of the switching control signal for the first switching element 5 while the common carrier frequency is used.

(4) The embodiments disclosed herein are only illustrative in all respects, Thus, various modifications may be made as appropriate without departing from the spirit of the disclosure.

4. Summary of Embodiments

A summary of a power conversion device (1) described above is briefly described below.

As one aspect, in the power conversion device (1), arms (9) are connected in parallel to each other between a DC positive terminal (P) and a DC negative terminal (N) in accordance with the number of phases of alternating currents of a plurality of phases. The arms (9) for the respective phases each include two switch sections (2) that are connected in series and to be brought into conduction in an on state and out of conduction in an off state. The power conversion device (1) is configured to convert electric power between DC power and AC power of the plurality of phases while a connection point between the two switch sections (2) of each of the arms (9) is set as an AC input or output point of each phase.

Each of the switch sections (2) includes a switching element (3) and a freewheeling diode (4) connected in parallel to the switching element (3) while a direction from the negative terminal (N) to the positive terminal (P) is set as a forward direction.

The switching element (3) is a first switching element (5) or a second switching element (7) that is higher in a switching response between the off state and the on state than the first switching element (5).

The freewheeling diode (4) is a first rectifying element (6) or a second rectifying element (8) that is shorter in a reverse recovery time than the first rectifying element (6).

In each of the arms (9), one of the switch sections (2) including an upper-stage switch section (21) connected to a positive terminal (P) side and a lower-stage switch section (22) connected to a negative terminal (N) side is structured through parallel connection between the first switching element (5) and the second rectifying element (8), and the other of the switch sections (2) is structured through parallel connection between the second switching element (7) and the first rectifying element (6).

For example, when the alternating current of any one phase is positive with respect to the amplitude center, and when the switching element (3 (31)) is in the on state, the current flows in the reverse direction with respect to the freewheeling diode (4 (41)) connected in parallel to the switching element (3 (31)) through the upper-stage switch section (21) of the arm (9) corresponding to the current of this phase. Thus, the current does not flow through the freewheeling diode (4 (41)). When the switching element (3 (31)) of the upper-stage switch section (21) is in the off state, the current does not flow through the upper-stage switch section (21). Therefore, when the alternating current is positive, and when the switching element (3 (31)) of the upper-stage switch section (21) is in the off state, the current flows in the forward direction with respect to the freewheeling diode (4 (42)) of the lower-stage switch section (22) through the lower-stage switch section (22) of the arm (9). That is, the current flows through the switching element (3 (32)) and the lower-stage freewheeling diode (4 (42)) of the lower-stage switch section (22). When the switching element (3 (31)) of the upper-stage switch. section (21) is in the on state, the current does not flow through the lower-stage switch section (22).

That is, in a phase angle in which the alternating current is positive, when the current flows through the lower-stage switch section (22) of the arm (9) corresponding to the current of each phase, the current flows in the forward direction with respect to the freewheeling diode (4) of the lower-stage switch section (22). Thus, in the phase angle in which the alternating current is positive, when the current flows through the lower-stage switch section (22) of the arm (9) corresponding to the current of the phase, the freewheeling diode (4 (42)) of the lower-stage switch section (22) is definitely brought into conduction (turned on). The same applies to a case where the alternating current is negative. In a phase angle in which the alternating current is negative, when the current flows through the upper-stage switch section (21) of the arm (9) corresponding to the current of each phase, the current flows in the forward direction with respect to the freewheeling diode (4 (41)) of the upper-stage switch section (21). Thus, in the phase angle in Which the alternating current is negative, when the current flows through the upper-stage switch section (21) of the arm (9) corresponding to the current of the phase, the freewheeling diode (4 (41)) of the upper-stage switch section (21) of the arm (9) corresponding to the current of each phase is definitely brought into conduction.

That is, when the loss of a combination of the switching element (3 (31)) of the upper-stage switch section (21) and the freewheeling diode (4 (42)) of the lower-stage switch section (22) is small, the loss of the power conversion device (1) can be reduced in the phase angle in which the alternating current is positive. When the loss of a combination of the lower-stage switching element (3 (32)) and the upper-stage freewheeling diode (4 (41)) is small, the loss of the power conversion device (1) can be reduced in the phase angle in which the alternating current is negative. As the reverse recovery time of the freewheeling diode (4) is shorter, the time in which the loss occurs is also shorter. Therefore, the loss is reduced. During one cycle of the electrical angle of the alternating current, any one phase out of the plurality of phases is "positive". During one cycle of the electrical angle of the alternating current, any one phase out of the plurality of phases is "negative". By employing one of the combination focusing on the case where the alternating current is "positive" and the combination focusing on the case where the alternating current is "negative", the loss of the inverter circuit (10) can be reduced over the entire period in one cycle of the electrical angle.

The modulation frequency of each of the AC voltages of the plurality of phases is determined by the line-to-line voltage. By employing one of the combination focusing on the case where the alternating current is "positive" and the combination focusing on the case where the alternating current is "negative", the modulation frequency can be increased while an increase in the loss along with an increase in the number of switching operations is suppressed. When the modulation frequency is increased, the AC waveform is further stabilized, and pulsation and distortion are reduced. Further, the amplitude of a pulsation component on the DC side is reduced. Even if the reduction in the loss of the power conversion device (1) is canceled between the employment of the switching element (3) that is small in the loss and the increase in the switching frequency, there is a possibility that the loss occurring in the power conversion device (1) itself or in other circuits connected to the power conversion device (1) can be reduced.

According to this configuration, one of the switch sections (2) including the upper-stage switch section (21) and the lower-stage switch section (22) is structured through parallel connection between the first switching element (5) and the second rectifying element (8), and the other of the switch sections (2) is structured through parallel connection between the second switching element (7) and the first rectifying element (6). According to this configuration, it is possible to achieve a combination in which the upper-stage switching element (3 (31)) and the lower-stage freewheeling diode (4 (42)) correspond to the second switching element (7) and the second rectifying element (8), respectively, or a combination in which the lower-stage switching element (3 (32)) and the upper-stage freewheeling diode (4 (41)) correspond to the second switching element (7) and the second rectifying element (8), respectively. Thus, at least the loss of the power conversion device (1) can be reduced. Even if the reduction in the loss of the power conversion device (1) is canceled as described above, there is a possibility that the loss occurring in the power conversion device (1) itself or in other circuits connected to the power conversion device (1) can be reduced. That is, according to this configuration, the loss of the power conversion device (1) including the freewheeling diodes (4) can be reduced even when the upper stage and the lower stage are switched at different switching frequencies in order to improve the efficiency and reduce noise in the power conversion device (1) including the arms (9) each structured by different types of switching element (3) at the upper stage and the lower stage.

As described above, the second switching element (7) is an element that is higher in the switching response than the first switching element (5). The second rectifying element (8) is an element that is shorter in the reverse recovery time than the first rectifying element (6), and therefore the response is high. When both of the second switching element (7) and the second rectifying element (8) are elements that are high in the response, the switching frequency of the power conversion device (1) can be increased, whereby pulsation and distortion of the AC waveform can be reduced. Thus, when the power conversion device (1) is connected to an AC device, the loss of the AC device is reduced, whereby the efficiency can he improved. Further, the amplitude of pulsation on the DC side can he reduced. For example, when the smoothing capacitor is provided between the DC positive terminal (P) and the DC negative terminal (N), reduction in the capacitance of the smoothing capacitor can be expected.

As one aspect, it is preferable that the power conversion device (1) include a drive control section (20) that outputs switching control signals for performing switching control on the switch sections (2), and that each of the arms (9) have an operating state in which a frequency of the switching control signal for the second switching element (7) is higher than a frequency of the switching control signal for the first switching element (5).

As described above, the second switching element (7) and the second rectifying element (8) are arranged so as to reduce the loss of the combination of the upper-stage switching element (3) and the lower-stage freewheeling diode (4) or the loss of the combination of the lower-stage switching element (3) and the upper-stage freewheeling diode (4). Thus, in the operating state in which the frequency of the switching control signal for the second switching element (7) that is relatively small in the loss is higher than the frequency of the switching control signal for the first switching element (5), the modulation frequency can be increased while an increase in the loss is suppressed.

As one aspect, it is preferable that the power conversion device (1) include the drive control section (20) that outputs the switching control signals for performing switching control on the switch sections (2), and that, during a period in which a forward current flows through the freewheeling diode (4) of each of the arms (9), the switching control signal for the switching element (3) connected in parallel to the freewheeling diode (4) be in an ineffective state.

As described above, in the phase angle in which the alternating current is positive, when the current flows through the lower stage of the arm (9) corresponding to the current of each phase, the current flows in the forward direction with respect to the. lower-stage freewheeling diode (4 (42)). That is, when the alternating current is positive, the lower-stage switching element (3 (32)) of the arm (9) corresponding to the current of the phase can be energized at an appropriate timing through the lower-stage freewheeling diode (4 (42)) without complementarily switching the upper-stage switching element (3 (31)). In the phase angle in which the alternating current is negative, when the current flows through the upper stage of the arm (9) corresponding to the current of each phase, the current flows in the forward direction with respect to the upper-stage freewheeling diode (4 (41)). That is, when the alternating current is negative, the upper-stage switching element (3 (31)) of the arm (9) corresponding to the current of the phase can be energized at an appropriate timing through the upper-stage freewheeling diode (4 (41)) without complementarily switching the lower-stage switching element (3 (32)). Therefore, the switching control signal for the switching element (3) having no need for switching can be kept in the ineffective state during a period in which the switching is not necessary (period in which the forward current flows through the freewheeling diode (4) connected in parallel to the switching element (3)). Thus, the switching loss occurring in the switching element (3) can be reduced. The number of occasions to complementarily switch the upper-stage switch section (21) and the lower-stage switch section (22) is reduced in one arm (9), thereby reducing the number of occasions to consider the dead time in which both the switch sections (21 and 22) are controlled in the off state. The reduction in the time to consider the dead time in one cycle of the electrical angle leads to an increase in the number of occasions for switching, whereby the switching frequency can be increased.

It is preferable that the frequency of the switching control signal for the first switching element (5) have a fixed value, and that the frequency of the switching control signal for the second switching element (7) have a variable value. As described above, the frequency of the switching control signal for the second switching element (7) that is relatively small in the loss is set higher than the frequency of the switching control signal for the first switching element (5), whereby the modulation frequency can be increased while an increase in the loss is suppressed. When the frequencies of the switching control signals for both of the first switching element (5) and the second switching element (7) are variable, the control to be performed by the drive control section (20) may be complicated. The increase in the modulation frequency can be achieved by increasing the switching frequency of the second switching element (7). When only the frequency of the switching control signal for the second switching element (7) has a variable value, the increase in the modulation frequency can be achieved while the complication of the control to be performed by the drive control section (20) is suppressed.

Alternatively, it is preferable that both of the frequency of the switching control signal for the first switching element (5) and the frequency of the switching control signal for the second switching element (7) have variable values. In this case, the control to be performed by the drive control section (20) is somewhat complicated, but both of the frequency of the switching control signal for the first switching element (5) and the frequency of the switching control signal for the second switching element (7) can be set appropriately in accordance with the operating state of the power conversion device at each time point. Thus, the loss of the system of the power conversion device (1) can further be reduced.

As one aspect, it is preferable that the power conversion device (1) be provided between an AC rotating electrical machine (80) and a DC power supply (11), and that the frequency of the switching control signal be set in accordance with at least one of a speed of the rotating electrical machine (80), a torque of the rotating electrical machine (80), and a modulation rate from a direct current to an alternating current. As the frequency of the switching control signal is higher, the waveform of the generated alternating current is closer to a sinusoidal wave, whereby pulsation and distortion of the waveform are reduced. Allowable ranges of pulsation and distortion differ depending on the forms and conditions of use of the power conversion device (1). Thus, it is preferable that the frequency of the switching control signal be set in accordance with the speed and the torque of the rotating electrical machine (80) to be driven via the power conversion device (1), the modulation rate between the direct current and the alternating current, and the like.

As one aspect, it is preferable that the first switching element (5) be a Si-IGBT or a Si-MOSFET, and that the second switching element (7) be a SiC-MOSFET, a GaN-MOSFET, or a SiC-IGBT.

Semiconductor materials such as silicon carbide (SiC) and gallium nitride (GaN) have a wider band gap than silicon (Si), and are referred to as wide band gap semiconductors. Thus, those semiconductor materials have a higher performance than silicon. For example, an IGBT (SiC-IGBT) and a MOSFET (SiC-MOSFET) using SiC as a material are capable of performing higher-speed switching than an IGBT (Si-IGBT) using Si as a material. Therefore, those elements are small in the loss and can he used at higher switching frequencies. Thus, those elements are preferable as the second switching element (7). However, the elements using SiC or GaN as a substrate are currently more expensive than those using Si because of their short history of practical use. The first switching element (5) is not required to achieve such a high-speed switching and a small loss as those in the second switching element (7). Thus, the element using relatively inexpensive Si as a substrate is preferable as the first switching element (5).

As one aspect, it is preferable that the first rectifying element (6) be a fast recovery diode, and that the second rectifying clement (8) be a SiC-Schottky barrier diode. The fast recovery diode is a diode that is relatively short in the time in which forward current continuously flows after the on state in which a forward voltage is applied is switched to the off state (reverse recovery time). Thus, the fast recovery diode is preferable as the freewheeling diode (4) of the inverter circuit (10). In view of the operating principle, the reverse recovery time is not present in the Schottky barrier diode, and therefore a higher-speed operation is possible as compared to the fast recovery diode. Thus, the Schottky barrier diode is preferable as the second rectifying element (8) that is shorter in the reverse recovery time than the first rectifying element (6). A Schottky barrier diode using Si as a substrate has a problem with the withstand voltage, but the Schottky barrier diode using SiC as a substrate achieves a higher withstand voltage. Thus, it is preferable that the SiC-Schottky barrier diode be applied to the second rectifying element (8). The fast recovery diode that is the first rectifying element (6) may be any of the element using Si as a substrate and the element using SiC as a substrate.

The invention claimed is:

1. A power conversion device comprising:
    an inverter circuit in which arms are connected in parallel to each other between a DC positive terminal and a DC negative terminal in accordance with a number of phases of alternating currents of a plurality of phases, the arms for the respective phases each including two switch sections that are connected in series and to be brought into conduction in an on state and out of conduction in an off state, the power conversion device being configured to convert electric power between DC power and AC power of the plurality of phases while a connection point between the two switch sections of each of the arms is set as an AC input or output point of each phase, wherein
    each of the switch sections includes a switching element and a freewheeling diode connected in parallel to the switching element while a direction from the negative terminal to the positive terminal is set as a forward direction, the switching element is a first switching element or a second
    switching element that is higher in a switching response between the off state and the on state than the first switching element,
    the freewheeling diode is a first rectifying element or a second rectifying element that is shorter in a reverse recovery time than the first rectifying element, and
    in each of the arms, one of the switch sections including an upper-stage switch section connected to a positive terminal side and a lower-stage switch section connected to a negative terminal side is structured through parallel connection between the first switching element and the second rectifying element, and the other of the switch sections is structured through parallel connection between the second switching element and the first rectifying element.

2. The power conversion device according to claim 1, comprising
    a controller that outputs switching control signals for performing switching control on the switch sections, wherein
    each of the arms has an operating state in which a frequency of the switching control signal for the second switching element is higher than a frequency of the switching control signal for the first switching element.

3. The power conversion device according to claim 2, comprising
    a controller that outputs switching control signals for performing switching control on the switch sections, wherein
    during a period in which a forward current flows through the freewheeling diode of each of the arms, the switching control signal for the switching element connected in parallel to the freewheeling diode is in an ineffective state.

4. The power conversion device according to claim 3, wherein a frequency of the switching control signal for the first switching element has a fixed value, and a frequency of the switching control signal for the second switching element has a variable value.

5. The power conversion device according to claim 4, wherein
    the power conversion device is provided between an AC rotating electrical machine and a DC power supply, and
    the frequency of the switching control signal is set in accordance with at least one of a speed of the rotating electrical machine, a torque of the rotating electrical machine, and a modulation rate from a direct current to an alternating current.

6. The power conversion device according to claim 5, wherein the first switching element is a Si-IGBT or a Si-MOSFET, and the second switching element is a SiC-MOSFET, a GaN-MOSFET, or a SiC-IGBT.

7. The power conversion device according to claim 6, wherein the first rectifying element is a fast recovery diode, and the second rectifying element is a SiC-Schottky barrier diode.

8. The power conversion device according to claim 1, comprising
    a controller that outputs switching control signals for performing switching control on the switch sections, wherein
    during a period in which a forward current flows through the freewheeling diode of each of the arms, the switching control signal for the switching element connected in parallel to the freewheeling diode is in an ineffective state.

9. The power conversion device according to claim 1, wherein the first switching element is a Si-IGBT or a Si-MOSFET, and the second switching element is a SiC-MOSFET, a GaN-MOSFET, or a SiC-IGBT.

10. The power conversion device according to claim 1, wherein the first rectifying element is a fast recovery diode, and the second rectifying element is a SiC-Schottky barrier diode.

11. The power conversion device according to claim 2, wherein a frequency of the switching control signal for the first switching element has a fixed value, and a frequency of the switching control signal for the second switching element has a variable value.

12. The power conversion device according to claim 2, wherein both of a frequency of the switching control signal for the first switching element and a frequency of the switching control signal for the second switching element have variable values.

13. The power conversion device according to claim 2, wherein
the power conversion device is provided between an AC rotating electrical machine and a DC power supply, and
the frequency of the switching control signal is set in accordance with at least one of a speed of the rotating electrical machine, a torque of the rotating electrical machine, and a modulation rate from a direct current to an alternating current.

14. The power conversion device according to claim 2, wherein the first switching element is a Si-IGBT or a Si-MOSFET, and the second switching element is a SiC-MOSFET, a GaN-MOSFET, or a SiC-IGBT.

15. The power conversion device according to claim 2, wherein the first rectifying element is a fast recovery diode, and the second rectifying element is a SiC-Schottky barrier diode.

16. The power conversion device according to claim 3, wherein both of a frequency of the switching control signal for the first switching element and a frequency of the switching control signal for the second switching element have variable values.

17. The power conversion device according to claim 3, wherein
the power conversion device is provided between an AC rotating electrical machine and a DC power supply, and
the frequency of the switching control signal is set in accordance with at least one of a speed of the rotating electrical machine, a torque of the rotating electrical machine, and a modulation rate from a direct current to an alternating current.

18. The power conversion device according to claim 3, wherein the first switching element is a Si-IGBT or a Si-MOSFET, and the second switching element is a SiC-MOSFET, a GaN-MOSFET, or a SiC-IGBT.

19. The power conversion device according to claim 3, wherein the first rectifying element is a fast recovery diode, and the second rectifying element is a SiC-Schottky barrier diode.

20. The power conversion device according to claim 4, wherein the first switching element is a Si-IGBT or a Si-MOSFET, and the second switching element is a SiC-MOSFET, a GaN-MOSFET, or a SiC-IGBT.

* * * * *